United States Patent
Barnett et al.

(10) Patent No.: US 7,734,775 B2
(45) Date of Patent: Jun. 8, 2010

(54) METHOD OF SEMI-AUTOMATIC DATA COLLECTION, DATA ANALYSIS, AND MODEL GENERATION FOR THE PERFORMANCE ANALYSIS OF ENTERPRISE APPLICATIONS

(75) Inventors: Paul T. Barnett, Plano, TX (US); Daniel M. Braddock, Austin, TX (US); Allan Drew Clarke, Austin, TX (US); David Leigh DuPré, Lookout Mountain, GA (US); Richard Gimarc, Austin, TX (US); Theodore F. Lehr, Austin, TX (US); Annette Palmer, Austin, TX (US); Rajinikala Ramachandran, Austin, TX (US); James Reynolds, Mt. Desert, MA (US); Amy Carolyn Spellmann, Dripping Springs, TX (US); Carolyn West, Austin, TX (US); Timothy E. Wise, Austin, TX (US); Tom Zauli, Boston, MA (US); Kenneth Zink, Austin, TX (US)

(73) Assignee: Hyperformix, Inc, Austin, TX (US)

( * ) Notice: Subject to any disclaimer, the term of this patent is extended or adjusted under 35 U.S.C. 154(b) by 0 days.

(21) Appl. No.: 11/977,824

(22) Filed: Oct. 26, 2007

(65) Prior Publication Data

US 2008/0059625 A1    Mar. 6, 2008

Related U.S. Application Data

(63) Continuation of application No. 10/354,230, filed on Jan. 29, 2003, now Pat. No. 7,290,048.

(60) Provisional application No. 60/376,613, filed on May 1, 2002, provisional application No. 60/368,923, filed on Mar. 29, 2002, provisional application No. 60/376,612, filed on May 1, 2002, provisional application No. 60/372,846, filed on Apr. 16, 2002, provisional application No. 60/372,837, filed on Apr. 16, 2002.

(51) Int. Cl.
*G06F 15/173* (2006.01)
*G06F 11/00* (2006.01)

(52) U.S. Cl. .................. 709/224; 709/223; 714/39; 703/14

(58) Field of Classification Search .............. 714/39; 709/223–224; 703/13–14
See application file for complete search history.

(56) References Cited

U.S. PATENT DOCUMENTS

| | | | |
|---|---|---|---|
| 6,173,384 B1 * | 1/2001 | Weaver | 711/216 |
| 6,282,701 B1 * | 8/2001 | Wygodny et al. | 717/125 |
| 6,789,116 B1 * | 9/2004 | Sarkissian et al. | 709/224 |

(Continued)

*Primary Examiner*—Philip J Chea
(74) *Attorney, Agent, or Firm*—Schultz & Associates, P.C.

(57) ABSTRACT

A method of semi-automatic data collection, data analysis and model generation for performance analysis of computer networks and software is provided. The invention provides a graphical user interface which indicates the overall data flow in the performance analysis process and guides the user through the proper sequence of steps in that process. Underneath the graphical user interface, the invention provides software tools which include novel data pipeline for transformation of network traces, resource data and application data into organized hash tables, and further into spreadsheets for introduction into computer network simulation programs. The invention also provides novel algorithms for recognizing transaction and parentage between transactions from low level network trace data. The invention further provides novel methods of visualization of trace data and transaction and parentage associations.

20 Claims, 31 Drawing Sheets

U.S. PATENT DOCUMENTS 7,184,945 B1 * 2/2007 Takahashi et al. ............. 703/22
7,197,559 B2    3/2007 Goldstein et al.
7,376,937 B1 * 5/2008 Srivastava et al. ........... 717/128
2003/0088643 A1 5/2003 Shupps et al.

* cited by examiner

FIG. 9A

| | A | B | C | D | E | F | G | H | I | J |
|---|---|---|---|---|---|---|---|---|---|---|
| 1 | Format: TransactionReport | | | | | | | | | |
| 2 | Traceability: Original 16:57:41 11-8-2002 F<1> = =payroll.pm | | | | | | | | | |
| 3 | User: zink | | | | | | | | | |
| 4 | Header Line | 6 | | | | | | | | |
| 5 | Description: | | | | | | | | | |
| 6 | Start Time | Business Function | Caller | Name | Requestor | Replier | Extra | Transaction Response Time | Request Time | Service Time |
| 7 | 03:23.0 | | n/a | HTTP0 | Client:1043 | iPlanet:80 | GET /pc | 0.856 | 0 | 0.843 |
| 8 | 03:23.0 | | HTTP0 | TCP1 | iPlanet:1028 | WebLogic:7001 | | 0.844 | 0 | 0.829 |
| 9 | 03:23.9 | | n/a | HTTP1 | Client:1044 | iPlanet:80 | GET /pc | 0.193 | 0 | 0.185 |
| 10 | 03:23.9 | | HTTP1 | TCP5 | iPlanet:1029 | WebLogic:7001 | | 0.186 | 0 | 0.179 |
| 11 | 03:24.0 | | n/a | HTTP5 | Client:1048 | iPlanet:80 | GET /pc | 0.015 | 0 | 0.015 |
| 12 | 03:24.1 | | HTTP5 | TCP15 | iPlanet:1033 | WebLogic:7001 | | 0.002 | 0 | 0.002 |
| 13 | 03:24.2 | | n/a | HTTP13 | Client:1056 | iPlanet:80 | GET /pc | 0.025 | 0 | 0.015 |
| 14 | 03:24.2 | | n/a | HTTP14 | Client:1057 | iPlanet:80 | GET /pc | 0.023 | 0 | 0.022 |
| 15 | 03:24.2 | | HTTP14 | TCP54 | iPlanet:1041 | WebLogic:7001 | | 0.009 | 0 | 0.006 |
| 16 | 03:24.2 | | HTTP14 | TCP55 | iPlanet:1042 | WebLogic:7001 | | 0.014 | 0 | 0.012 |
| 17 | 03:24.3 | | n/a | HTTP15 | Client:1058 | iPlanet:80 | POST /p | 0.091 | 0 | 0.091 |
| 18 | 03:24.3 | | HTTP15 | TCP61 | iPlanet:1043 | WebLogic:7001 | | 0.09 | 0 | 0.09 |
| 19 | 03:24.3 | | TCP61 | TCP62 | WebLogic:1031 | LogServer:8089 | | n/a | 0.008 | n/a |
| 20 | 03:24.3 | | TCP61 | TCP63 | WebLogic:1033 | Database:1031 | | 0.061 | 0 | 0.061 |

FIG. 9B

| | A | J | K | L | M | N | O | P | Q | R | S | T |
|---|---|---|---|---|---|---|---|---|---|---|---|---|
| 1 | Format: TransactionReport | | | | | | | | | | | |
| 2 | Traceability: Original 16:57:41 11-8-2002 F<1> = =payroll.pm | | | | | | | | | | | |
| 3 | User: zlrk | | | | | | | | | | | |
| 4 | Header lines | | | | | | | | | | | |
| 5 | Description: | | | | | | | | | | | |
| 6 | Start Time | Service Time | Reply Time | Request Frame Count | Request Size (Wire) | Request Size (Payload) | Reply Frame Count | Reply Size Wire | Reply Size (Payload) | Protocol | Tags | Commen |
| 7 | 03:23.0 | 0.843 | 0.013 | 1 | 205 | 151 | 7 | 6439 | 6061 | HTTP | F<1:193> | |
| 8 | 03:23.0 | 0.829 | 0.015 | 1 | 385 | 331 | 10 | 6603 | 6057 | TCP | F<1:441> | |
| 9 | 03:23.9 | 0.185 | 0.008 | 1 | 346 | 292 | 7 | 4852 | 4474 | HTTP | F<1:2277> | |
| 10 | 03:23.9 | 0.179 | 0.007 | 1 | 542 | 488 | 9 | 4956 | 4470 | TCP | F<1:2481> | |
| 11 | 03:24.0 | 0.015 | 0 | 1 | 346 | 292 | 2 | 439 | 331 | HTTP | F<1:4763> | |
| 12 | 03:24.1 | 0.002 | 0 | 1 | 542 | 488 | 3 | 495 | 327 | TCP | F<1:6216> | |
| 13 | 03:24.2 | 0.015 | 0.01 | 1 | 345 | 291 | 6 | 3390 | 3066 | HTTP | F<1:18062> | |
| 14 | 03:24.2 | 0.022 | 0.001 | 1 | 337 | 283 | 3 | 1463 | 1301 | HTTP | F<1:18119> | |
| 15 | 03:24.2 | 0.006 | 0.003 | 1 | 540 | 486 | 8 | 3494 | 3062 | TCP | F<1:18422> | |
| 16 | 03:24.2 | 0.012 | 0.002 | 1 | 524 | 470 | 5 | 1573 | 1297 | TCP | F<1:18520> | |
| 17 | 03:24.3 | 0.091 | 0 | 1 | 531 | 477 | 2 | 644 | 536 | HTTP | F<1:20849> | |
| 18 | 03:24.3 | 0.09 | 0 | 2 | 770 | 662 | 3 | 700 | 532 | TCP | F<1:21057> | |
| 19 | 03:24.3 | n/a | n/a | 3 | 636 | 474 | 0 | n/a | n/a | TCP | F<1:21205> | |
| 20 | 03:24.3 | 0.061 | 0 | 1 | 172 | 118 | 1 | 99 | 45 | TCP | F<1:21474> | |

Sum=8.422

*FIG. 10A*

| | A | B | C | D | E | F |
|---|---|---|---|---|---|---|
| 1 | Hy·Perform·iX Application Model Generator<br>Making ebusiness Perform | | | | | |
| 2 | Business Function | Subsystem | Transaction | Invocation type | Description | |
| 3 | payroll_trans | | | | | |
| 4 | | iPlanet_Subsystem | payroll_trans_HTTP0 | SYNCHRONOUS | | |
| 5 | | iPlanet_Subsystem | payroll_trans_HTTP1 | SYNCHRONOUS | | |
| 6 | | iPlanet_Subsystem | payroll_trans_HTTP5 | SYNCHRONOUS | | |
| 7 | | iPlanet_Subsystem | payroll_trans_HTTP13 | SYNCHRONOUS | | |
| 8 | | iPlanet_Subsystem | payroll_trans_HTTP14 | SYNCHRONOUS | | |
| 9 | | iPlanet_Subsystem | payroll_trans_HTTP15 | SYNCHRONOUS | | |

Business Function Flow / Transaction Flow / Transaction Properties

FIG. 10B

| | Subsystem | Transaction | Property | Property Value | Property Unit | Description |
|---|---|---|---|---|---|---|
| 222 | WebLogic Subsystem | | | | | |
| 223 | | payroll_trans_CPU | Server Time | 0.829 | Seconds | |
| 224 | | | Resources Consumed | | | |
| 225 | | | CPU Consumption | | Seconds | |
| 226 | | | Time | | SPEC Cint95_ints | |
| 227 | | | Performance | | | |
| 228 | | | I/O Consumption | | | |
| 229 | | | Target File | READ | | |
| 230 | | | I/O Type | | | |
| 231 | | | Size | | Bytes | |
| 232 | | | Memory Consumption | | | |
| 233 | | | Shared | | Kilobytes | |
| 234 | | | Private In | | Kilobytes | |

Transaction Flow / Transaction Properties / Workload / Client

FIG. 10C

Hy-Perform-iX Application Model Generator
Making ebusiness Perform

| | A | B | C | D | E | F |
|---|---|---|---|---|---|---|
| 1 | | Caller_Transaction | Callee_Subsystem | Callee_Transaction | Invocation Type | Description |
| 2 | Caller_Subsystem | | | | | |
| 3 | iPlanet_Subsystem | payroll_trans_HTTP0 | | | | |
| 4 | | | WebLogic_Subsystem | payroll_trans_TCP1 | SYNCHRONOUS | |
| 5 | iPlanet_Subsystem | payroll_trans_HTTP1 | | | | |
| 6 | | | WebLogic_Subsystem | payroll_trans_TCP5 | SYNCHRONOUS | |
| 7 | iPlanet_Subsystem | payroll_trans_HTTP14 | | | | |
| 8 | | | WebLogic_Subsystem | payroll_trans_TCP54 | SYNCHRONOUS | |
| 9 | | | WebLogic_Subsystem | payroll_trans_TCP55 | SYNCHRONOUS | |
| 10 | iPlanet_Subsystem | payroll_trans_HTTP15 | | | | |
| 11 | | | WebLogic_Subsystem | payroll_trans_TCP61 | SYNCHRONOUS | |
| 12 | iPlanet_Subsystem | payroll_trans_HTTP5 | | | | |
| 13 | | | WebLogic_Subsystem | payroll_trans_TCP15 | SYNCHRONOUS | |
| 14 | WebLogic_Subsystem | payroll_trans_TCP61 | | | | |
| 15 | | | LogServer_Subsystem | payroll_trans_TCP62 | ASYNCHRONOUS | |

Business Function Flow / Transaction Flow / Transaction Properties

FIG. 10E

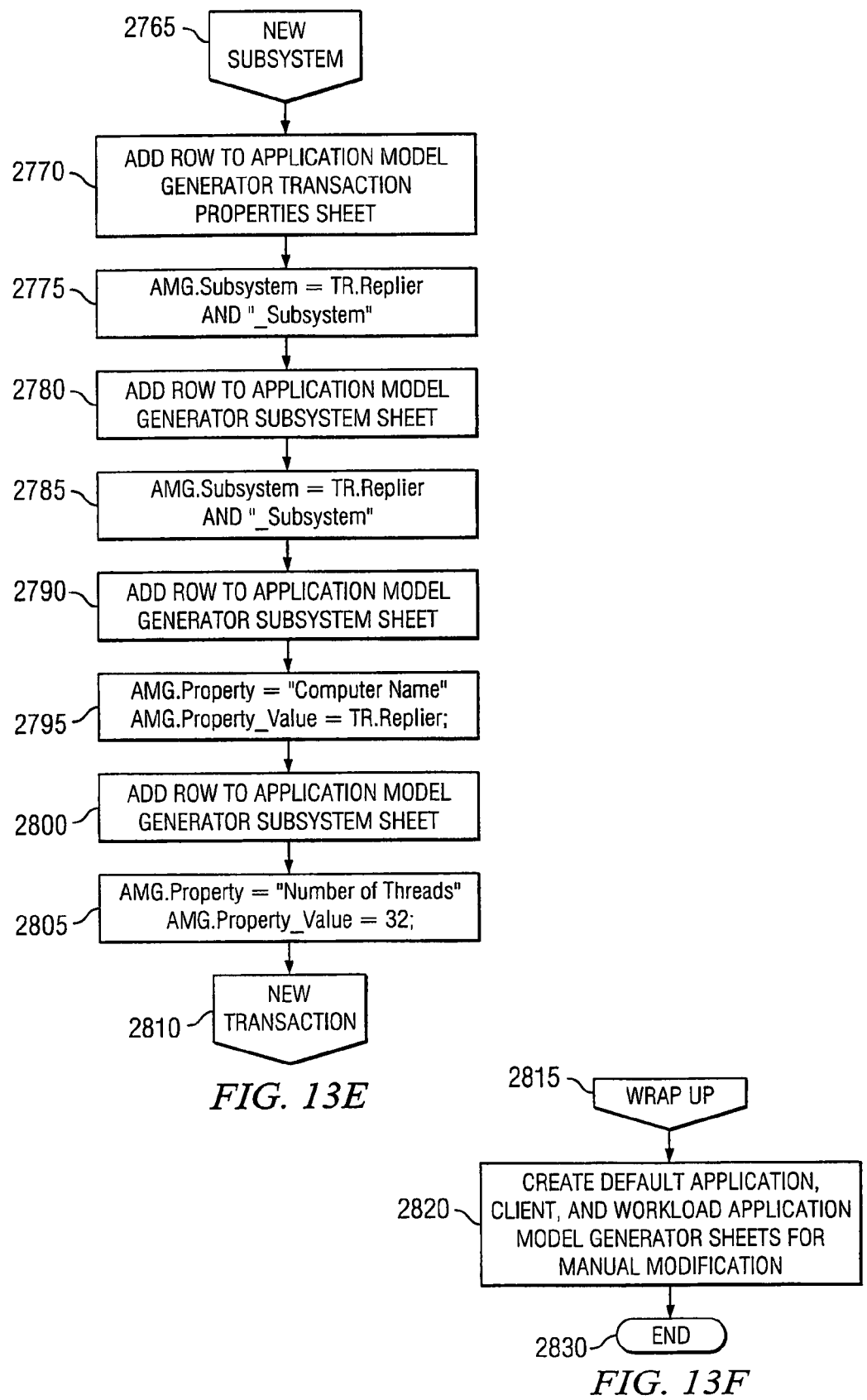

METHOD OF SEMI-AUTOMATIC DATA COLLECTION, DATA ANALYSIS, AND MODEL GENERATION FOR THE PERFORMANCE ANALYSIS OF ENTERPRISE APPLICATIONS

CROSS-REFERENCE TO RELATED APPLICATIONS

This application is a Continuation claiming priority benefit from U.S. patent application Ser. No. 10/354,230 entitled "A method of semi-automatic data collection, data analysis, and model generation for the performance analysis of enterprise applications" filed on Jan. 29, 2003, now U.S Pat. No. 7,290,048 which in turn claims priority to U.S. Provisional Patent Application Nos. 60/376,613 filed May 1, 2002; 60/368,923 filed Mar. 29, 2002; 60/376,612 filed May 1, 2002; 60/372,846 filed Apr. 16, 2002; and 60/372,837 filed Apr. 16, 2002.

FIELD OF THE INVENTION

The field of the invention is computer software used to simulate and analyze enterprise applications.

BACKGROUND OF THE INVENTION

Modern enterprise applications are characterized by multiple components deployed across multiple network tiers (sets of computers) accessed by users across a network. Examples of enterprise applications include Enterprise Resource Planning (ERP), Customer Relationship Management (CRM), Supply Chain Management (SCM), and Online Banking, Brokerage, Insurance and Retailing. An enterprise application typically provides a variety of business functions that users may execute. For example, an online stock trading application may provide some of the following business functions: log in, display account status, retrieve stock prospectus, sell stock, buy stock, log out.

When a user executes such a business function, a sequence of transactions is performed by the enterprise application, with each transaction consisting of a source component transmitting a request (via network message) to a destination component, often on another tier, and perhaps waiting for a reply message. The destination component processes the request and in the processing consumes local (server) resources such as cpu, disk input/output, and memory and may generate subsequent requests (subtransactions) to other components.

The time that elapses between the user executing the business function (submitting his or her request) and the display of the results on the user's workstation is called the end user response time. The end user response time is typically the most critical measure of end user satisfaction with application performance. If the response times are too long, end users will be unsatisfied and many will take their business elsewhere.

In order to maintain and improve good end user performance, application and system managers must understand the current performance of their applications, be able to identify and predict current and future performance problems, and evaluate potential solutions to those problems.

In the prior art, complex systems in general and enterprise applications in particular have always been managed in part by rules of thumb. These rules derive crude solutions to common problems. For example: if server utilization exceeds 67%, upgrade the server computing (CPU) capacity. The manager of such a system or application obtains such rules of thumb from the system and application vendors, personal experience, training and research.

Unfortunately, such rules of thumb are highly unreliable for complex systems whose behavior is difficult to understand and predict such as enterprise applications. Such rules can suggest solutions that are expensive and ineffective and even counter-productive. For example, upgrading the server in the example above may be completely unnecessary to obtain good performance and may even degrade the performance seen by some application users.

Over the years, system managers have improved upon rules of thumb for performance management of enterprise applications by monitoring the performance behavior of production applications. Monitoring refers to the collection of performance data as the application executes in the production environment. Monitoring tools only provide a subset of the data necessary to conduct an analysis of the performance of an enterprise application The performance data necessary to conduct such an analysis includes the following:

Workload
    The number of users, what functions of the application they are using, and how frequently they execute such functions Application Workflow
    The flow of transactions (or messages) among components of the application that occur when a particular business functions is executed by a user Resource Consumption
    The resources consumed by the process of each transaction, such as the following:
    CPU
    Disk input/output
    Memory
    Request and reply message sizes Hardware and System Topology (Infrastructure)
    The location, configuration and interconnection of all the hardware and system components Deployment
    The assignment of application components to infrastructure components
    The configuration of application components (e.g., number of threads, pool sizes, load balancing algorithms)

Performance Measures
    End user response times and throughputs
    Server, interconnect and data link utilizations
    Queue lengths The granularity at which such data is collected is critical to the usefulness of the data. For example, the disk input/output data is often collected in terms of total numbers of reads and writes, total read bytes and total write bytes that occur during the monitoring period. Unfortunately, the performance analyst needs to see a breakdown of that input/output by application, process (application component), service, and transaction.

In addition, it is particularly important to know the transaction workflow (the sequence of messages that result in the user's execution of a particular business functions) and the resources consumed during the processing of each transaction. Unfortunately, most network monitoring solutions available today report data at either gross aggregations of millions of bytes transmitted during a monitoring period or at the packet or frame level of granularity, whereas a message is typically composed of a number of packets or frames. In addition, the monitoring data is typically collected separately for each network segment or tier and the sets of data from the multiple segments or tiers is not correlated. So, it is very difficult to reconstruct the transaction workflow (sequences of messages corresponding to a particular business function) from the monitoring data.

In the prior art, some understanding of current application performance through monitoring could be obtained. However, the monitoring data from product systems will not by itself identify future performance problems or good solutions to current problems.

To successfully manage an enterprise application, one must understand not only its current performance but predict its performance under different possible future situations. One must be able to answer questions such as the following:

When will my current application break under increasing load?

What will be the bottleneck device at that time?

What changes to the infrastructure or application configuration will alleviate the bottleneck?

Which of these possible changes will yield the best performance at the lowest cost?

There are several prior art techniques that have been developed to make such predictions, including trend analysis, load testing, analytic modeling and predictive simulation, which are described next.

Prior art trend analysis allows performance analysts to make predictions by analyzing trends taken from measurements of application performance under differing load, from either a production system or test lab. For example, if the average end user response time is R at load L and is roughly 2R under load 2L, one might infer a linear trend and project a response time of XR under load XL for any X.

Simple trend analysis has not been very successful for modern enterprise applications, even when much more sophisticated trend analysis techniques have been used because such applications are often highly nonlinear. In addition, even when trend analysis predicts a performance bottleneck at a future load, it cannot predict the best solution to that bottleneck. Clearly trend analysis is an inadequate predictive technique.

Prior art load testing has also allowed performance analysts to make predictions. To understand how the performance of an application scales and otherwise behaves under increasing and varying load, many system managers configure a test version of the application in a laboratory and drive the application with an artificial load (a simulated set of users). The load is varied and the performance of the application is measured for each load. This approach is known as load testing. With it, one gains several advantages above and beyond rules of thumb and monitoring, including the following:

Measurement of the performance of the application (as configured in the test lab) in response to increasing and varying load.

Evaluation of the performance of different application configurations and infrastructures (hardware and system software) by implementing those configurations and infrastructures in the lab, load testing and measuring them.

Load testing has many drawbacks, including the following:

It is difficult, expensive and time-consuming to configure a laboratory installation identical to the production one, because of the complexities and subtleties of modern enterprise applications and infrastructures. As a result, the test environment is often significantly different from the production environment and the predicted performance of the production system must be inferred from the test environment measurements.

At best, load testing can identify potential future bottlenecks and other performance problems that may result under increasing or varying load, but cannot identify the solutions to those problems.

It is prohibitively expensive and time-consuming to load test all potentially good configurations to improve or optimize performance, since those configurations often require expensive additional equipment or very time-consuming reconfigurations of the application components.

Load testing is inadequate as a comprehensive planning method. One technique that overcomes some of the time and expense in load testing alternative application and infrastructure configurations is prior art analytic modeling.

In analytic modeling, a set of mathematical equations relating model inputs to performance outputs is derived and solved. For example, consider an M/M/1 queue, which has a Poisson arrival process, a Poisson service process, and a single first-come-first-serve server. The average response time, R, of such a system is given by the following equation:

$$R=S/(1-S/I),$$

Where
S=average service time
I=average interarrival time
So, if S=2 seconds and I=3 seconds, then R=2/(1−2/3) seconds=6 seconds.

If an accurate, flexible, analytic model of a enterprise application could be constructed, then quick and inexpensive productions of performance of applications could be made under varying future conditions.

Unfortunately, it is difficult to construct accurate analytic models of the simplest modern computing environments. The size and complexity of modern enterprise applications and the fundamental limitations of the analytic modeling technique make the analytic approach far too complex and inaccurate for most important problems.

A superior prior art technique is predictive discrete-event simulation. In a predictive discrete-event simulation, a mathematical model is created that simplifies the enterprise application simulation model as follows:

The model maintains the following data structures:
   The current simulation time (clock)
   The current state of the system being modeled (e.g., where the transactions are, which resources they possess, the status of their outstanding requests for additional resources, and the queues of such requests)
   A list of pending events known to occur in the near future, maintained in time order
A master event monitor drives the simulation model as follows:
   The next event on the pending event list is removed to become the current event (e.g., a transaction arriving or departing from a queue)
   The simulation clock is advanced to the time of the current event
   The state of the simulation is updated to reflect the occurrence of the event (e.g., the transaction location is updated to show the departure from or arrival to a queue, or resources are released from or allocated to the transaction)
   New events are posted to the event list if appropriate (e.g., if a departure event is simulated, an arrival event at the next queue is typically placed on the event list)
   If the simulation clock has not reached the ending time, the master event monitor begins again with first step above (removing the next event from the event list)

Discrete event simulation is a highly general and flexible technique. It applies to any system of discrete resources and transactions, regardless of complexity. Discrete event simulation is particularly effective in the representation of contention for resources—a key performance characteristic of complex systems. Therefore, it is a sufficient foundation for accurate prediction of the performance behavior of enterprise applications. The difficulty in applying this prior art technique lies in collecting data, analyzing data, and constructing the models. Traditionally these steps have been performed by hand and are error prone and time consuming.

The current invention focuses on automating these steps, reducing the errors and reducing the time required to complete a system analysis.

"Network performance management" refers to the performance analysis of computer networks such as those underlying enterprise applications. It includes reactive techniques, which identify current problems and react to them, as well as proactive techniques, which attempt to identify problems before they occur and avoid them through proactive corrective action.

One of the proactive techniques used in network performance management is discrete event simulation. Unfortunately, end users of an enterprise application may see poor performance even when the network performs well. Performance problems may exist with servers, middleware, databases, application configurations and other system components.

So, although network performance management using discrete event simulation is a major improvement over load testing and analytic techniques, it is inadequate as a comprehensive approach to enterprise application performance. A better approach, used by this invention, is based upon comprehensive "enterprise application modeling".

In order to create and maintain user satisfaction with enterprise application performance, one must predict the performance of such applications under varying possible scenarios, identify performance problems that occur in such scenarios and identify the best solutions to those problems.

To predict the performance seen by end users of a modern enterprise application using a simulation model, all the components of the application and infrastructure that affect end user performance must be represented. These components include the following:

Client Behavior: The clients, the requests they make of the application and the pattern and frequency of those requests.

Application Architecture and Behavior: The application components, their interaction (in particular, the sequences of requests exchanged and processed in response to a business function request) and the resources consumed when processing user requests.

Infrastructure: The internet, LAN, server, middleware, database and legacy components, interconnection and configuration.

Deployment: The assignment of application components to infrastructure components and the configuration of those application components.

Since the performance seen by end users of enterprise applications may depend upon any and all of these items all of them must be included in a performance model to accurately predict end user performance.

The current invention incorporates each of the above components in its performance models. Until the current invention, the data collection, data analysis, model generation and performance project management activities have been difficult, error prone, and time consuming.

This invention also enhances enterprise application modeling and applies a disciplined approach of load testing, data collection, automated data analysis, automated model generation and discrete event simulation to reduce the time required to produce and increase the accuracy of enterprise application modeling.

The invention requires raw performance data collected for use in an enterprise application performance project which includes network traffic, server data and application data. A variety of prior art products collect such data.

The collected data typically consists of a large number of low-level data files in varying formats that are not correlated or synchronized. The data must be analyzed for the following purposes:

To verify that the data was collected correctly.
To eliminate the large amount of extraneous data.
To raise the abstraction level of the data
To correlate the data obtained from the various sources
To recognize the sequences of messages (or transactions) forming each business function
To derive the resources consumed when processing each transaction In the prior art, data analysis is typically performed manually, using statistics packages and spreadsheets, an error-prone and time-consuming approach. This invention provides a semi-automatic solution to the general case of enterprise application performance data analysis.

After the data has been analyzed, a model must be created in order to use the data for predictive simulation. In the prior art, model creation is performed manually. A variety of modeling tools exist in the prior art, such as HyPerformix Infrastructure Optimizer™, SES/Workbench™ and Compuware Application Predictor, for creating models of computer hardware, software and networks. With these tools, a user constructs a model using a drag-and-drop GUI and may be able to import some collected data. However, the process of building the model is still error-prone and time-consuming, because of the following factors:

Modern enterprise applications consist of a large number of components inter-related in complex ways. Models of such applications need to represent these components and their relationships and so tend to be large and complex.

Most tools used to model enterprise applications do not contain adequate built-in domain knowledge of enterprise applications. For example, the user may need to program the concept of a "business function" as a sequence of inter-component transactions.

The user often has to program sequences of actions in an unfamiliar modeling language rather than simply declaring the attributes of the system with a familiar GUI.

The modeling language is insufficiently focused and general, thereby adding complexity and confusion to the process of data collection and data analysis to support the abstractions available in the modeling language.

The current invention addresses these factors as follows:

It automatically generates models from automatically analyzed data, thereby greatly simplifying the process of model creation.

It contains built-in knowledge of all the component types common to enterprise applications.

It provides an intuitively familiar and declarative rather than procedural GUI based upon spreadsheets.

The modeling user interface is based upon a minimal parameter set for characterizing the performance of enterprise applications, thereby simplifying the process of data collection, data analysis, and model creation.

Finally, a performance modeling project consists of a sequence of steps such as the following:

Load testing a laboratory configuration of the application.

Collecting raw performance data from the application under load in the test laboratory.

Analyzing the raw performance data to derive a higher level representation of the application performance behavior.

Constructing a base performance model from the analyzed data.

Executing the base performance model and comparing its predicted performance to the measured performance data to validate the model.

Using the validated model to predict future performance problems and evaluate potential solutions through a set of what-if experiments.

Each of these steps may involve a large number of substeps and complex data manipulations and produce a large number of data files. In the prior art, the user must take all of the required steps in the correct order and use the correct input files to arrive at a usable model.

The current invention simplifies this process and reduces errors by providing a graphical centralization of all the steps and input/output files.

SUMMARY OF THE INVENTION

The invention provides a graphical user interface which shows the overall data flow in the enterprise application performance analysis process and guides the user through the proper sequence of steps in that process. The graphical user interface insures the outputs from each step in the process are used as inputs only for legitimate and subsequent steps. Moreover, the graphical user interface allows the user to see which steps of the overall performance analysis process have or have not been performed and the current status of each of the data files in the process.

Underneath the graphical user interface, the invention uses input network traces, resource data and application data from various prior art data collection and performance monitoring software tools. This data is imported into a performance profiler tool that includes a novel data pipeline where the transformation of various network traces, resource data and application data into organized hash tables, to be further used in generating an enterprise application simulation model.

The novel performance profiler pipeline allows data visualization during the processing of data. The raw data visualization allows the user to see certain relationships between the data provided by the network traces, resource data and application data in a graphical format.

The data pipeline also provides a novel graphical profiler workflow analyzer which shows a graphical relationship between correlated network trace data and resource data, in a novel format which allows the user to visualize an integrated view of both network and resource data in a single diagram employing the use of a novel tool tip display of properties of graphical objects and the use of color spectrum to depict percentages of various resource utilization.

The invention also provides novel algorithms to recognize transactions from low level network trace data and deduce the transaction parentage among those results. The transaction recognizing algorithms are the present invention used in a novel concept of transaction recognition and transaction parenting to eliminate needless network trace and network resource data and to raise the level of abstraction available from this data.

The invention further provides a novel method of automatic model generation which further transforms network traces and resource data into spreadsheets which can be easily utilized by applications designers. A novel method of automatic model generation provides that these spreadsheets may be modified to be included in various enterprise simulation tools such as HyPerformix Infrastructure Optimizer™. The novel automatic model generator further provides for a novel minimum parameter set which allows the widest possible characterization of enterprise applications using a minimum number of representative parameters.

BRIEF DESCRIPTION OF THE DRAWINGS

FIGS. 9a and 9b are an example of a transaction report generated by the performance profiler tool of the preferred embodiment of the invention.

FIGS. 10a-g are examples of the spreadsheets generated by the application model generator tool of the preferred embodiment of the invention.

FIGS. 13a-f is a flow chart of the logical structure of the function of the application model generator tool of the preferred embodiment of the invention.

DETAILED DESCRIPTION OF THE PREFERRED EMBODIMENT

Data Collection Methodology

Figure 1:
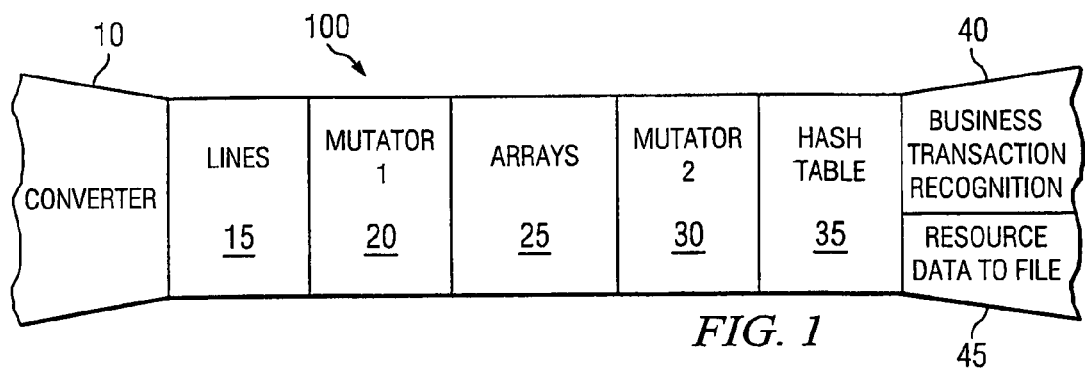
FIG. 1 is a graphical representation of the data pipeline in the performance profiler tool of the preferred embodiment of the invention.

This invention includes a new methodology for collecting enterprise application performance data for the purposes of data analysis and model generation. The methodology is described by the following pseudocode:

Methodology for collecting business transaction data

Configure the application and infrastructure in a laboratory similar to the production application and infrastructure with each software component deployed on different servers connected by networks.

For each business function:

Write a load testing script mimicking the user's execution of this business function.

Set up network sniffers between each tier of the enterprise application.

Synchronize the clocks on each network sniffer.

Initialize the network sniffer trace files and begin collecting data.

Use the load testing script to drive the application with one instance of this business function.

At the conclusion of the business function, stop collecting data.

Label this set of network trace files with the name of the current business function.

Feed the set of sniffer trace files into Profiler in order to identify the business transactions of this business function.

This new methodology simplifies and improves data analysis and model generation by isolating the network data for each business function, collecting all the network data required to recognize complete multi-tier business transactions, and synchronizing the set of network sniffer clocks so that related events from the different sniffer trace files can be correlated.

Performance Profiler Tool

In order to efficiently translate data employed by the invention, a pipeline for transforming low-level data is provided in the performance profiler tool.

This is a detailed description of the software program used to transform low level data into higher levels of abstraction to support analysis and report generation. Users typically deal with large amounts of low-level trace data and need to examine and manipulate this data in order to divine what is actually occurring on a network and the nodes that reside on that network.

The low-level data is clumsy to deal with for a number of reasons. The data is typically very bulky; it is common to have data files which are tens of megabytes large. In some cases, these files can grow over multiple gigabytes. The data can come from various sources, so that it is not isomorphic; there are many formats. Although the data is grouped in files, it is not uncommon to have multiple files that are logically related; they might be captures of activity on different network segments; therefore, the files must be merged and synchronized in order to be useful. The individual data collection tools also have bugs which cause data anomalies in the files.

The present invention provides for a data pipeline where the data is fed into the pipeline from a source file. The data is turned into a stream, that stream is processed sequentially by each element of the pipeline, with final results written to disk or other destination file when leaving the pipeline.

The stream of data, composed of "bundles" of data, changes form as it moves down each segment of the pipeline. Each bundle initially starts as line-oriented data and is processed by some number of pipeline elements. Then it is "mutated" into array-oriented data, where each line has been broken into an array of tokens. This bundle of data is processed by some number of pipeline elements. Finally, the bundle is "mutated" into a record or hash table, where each item can be retrieved by name (or type). The bundle is processed by the remaining pipeline elements.

Each element of the pipeline is responsible for a narrowly-defined task. The pipeline is fed from a data source tied to some input file. Usually this is followed by a "converter" which is responsible for taking raw data in a tool-specific format, and producing raw data that is in a standard form.

Most of the hard work of converting any given raw network trace file into "standard form" is done by a module called a converter. The input to a converter is usually a set of raw text lines, but it might be a set of records from a binary file. The output from a converter is one line (and in rare cases, two) that has comma-separated values. The mapping of input lines (or records) to output lines is sometimes one-to-one, but may be many-to-one.

It is common for the each input set of data (lines or records) to be very rich in data content. One of the responsibilities of the converter is to reduce this data content to "fit" on one line. When calculating the output comma-separated values, the converter sometimes passes selected data through unmodified, sometimes selected data is normalized then passed through, and sometimes many pieces of data are combined to create a single output value that is passed through. The content which is extracted from the resource data, application data and network traces is that required to complete network standard format and resource standard format as will be described below.

Most of the pipeline elements work at the record level, so occupy the later stage of the pipeline. Example elements do different types of filtering; for example, an element might reject bundles that represent data which is tagged with a certain protocol. To achieve filtering, the element resets or clears the bundle. Once a bundle has been cleared, it is no longer passed down the pipeline and control returns to the head of the pipeline to get a new bundle of data to process.

In addition to rejecting bundles, a pipeline element might modify a bundle so that all downstream pipeline elements see the newly modified data. Some pipeline elements do not modify data at all, but simply perform calculations and eventually write "reports" on the calculated values.

The data that needs to be processed will be one of three kinds, network-based data, resource-based data or application-based data. Network capture data maps directly to network-based data. Node performance monitor data maps to resource-based data. Network-based data captures the communications that occurs among nodes (computers) or tiers on a network. A typical tool is Network Associate's Sniffer Pro. Resource-based data captures the interesting counters or values within a given node. A typical tool is Microsoft's Performance Monitor for Windows. Application data takes the form of Web logs and custom application logs.

Network-based data is converted to "network standard format," which consists of a time series of values (rows), each with: time stamp, source address, destination address, relative time, delta time, size, protocol, tags, summary, and other columns. All but the "tags" and "other" column are populated directly with data derived from the input network data. The "tags" and "other" columns contain annotations which help support transaction recognition, pointers to original sources of data for traceability, and color coding tags for display purposes.

Resource-based data is converted to "resource standard format," which consists of a time series of values (rows), each with: time stamp, "tags", "other", and N columns of counter data. A counter is a named property of a node which has a measurable value. Examples might be cpu utilization, reads per second, writes per second, etc.

Application-based data is converted to "resource standard format" which appears like resource data.

The implementation of the data pipeline of the preferred embodiment may be described as follows:

```
For each input module:
    Give a chance to create a new pipeline instance
    If no pipeline instance
        Use a default pipeline
    Insert module into correct pipelet in pipeline
For each module in each pipeline
    Delegate a preflight check (for correct configuration)
While not done
    Done if early termination requested by module
    Done if user cancelled
    If not done
        For each pipeline
            Execute pipeline
    If done
        Preclose each pipeline
For each pipeline
    Pipeline close
For each pipeline
    Pipeline post close
Pipeline Object-oriented Methods
Pipeline Close
    For each module
        Module Close
Pipeline Execute
    Get data bundle from first module
    For each remaining module
        Module execute
    Return true if any work done
Pipeline PostClose
    For each module
        If closed not already invoked
            Module Close
Pipeline PreClose
    For each successive module
        Get data bundle from module
        If bundle is not empty
            For each successive module
                Module Execute
Pipeline Preflight
    For each module
        Module Preflight
```

The data bundle object-oriented methods of the preferred embodiment are as follows:

```
Bundle IsEmpty
    Return true if there is no data in this bundle
Bundle IsLineBased
    Return true if the data in this bundle is line oriented
Bundle IsArrayBased
    Return true if the data in this bundle is split into fields
Bundle IsHashBased
    Return true if the data in this bundle has been labeled
Bundle Data
    Return the list of actual data items
Bundle Reuse
    Discard the current data and use the supplied data instead
Bundle IsHeaderLine
    Return true if the line data is a header (before the table of data)
```

The variation in functionality in the preferred embodiment occurs at the module level. Each module is an object with methods. The canonical form for an abstract module is shown below. There are three main kinds of modules: sources, converters, and miscellaneous modules. Sources are responsible for supplying lines of information from a text file, a binary file, or database. Converters are responsible for changing the source data into substantially a raw standardized form.

The miscellaneous module functionality varies widely. These can be filters, which remove data that doesn't meet a criteria, report writers, or data modifiers. The preferred embodiment includes two kinds of sources: a text file reader and a binary cap file reader. There are numerous converters: Ethereal, Etherpeek, Netmon, Sniffer, SnifferPro, NCSA weblog, IIS weblog, Db2 Snapshot, Perfmon, Loadrunner Resource, Dstat, SAR, Measureware, Introscope, Best1, and Patrol Perform. The miscellaneous filtering modules are: time window (discards data outside a specified time range), frame window (discards data outside a specified frame number range), select addresses (discards data with addresses not in a specified group), select pairs (allows data only for communications among a specified list of pair of addresses), select (allows data only that matches a specified criteria). The miscellaneous reporting modules are: network/resource standard report (which shows all headings of interest), activity report (which shows network activity), network/resource summary report (which shows a summary of the network and resource headings), transaction report, and transaction summary report. The miscellaneous other modules are: no duplicate frames (enforces no duplicate frame number constraint), no duplicate content (discards data that is "close enough" to be a duplicate of some other frame), shift time (shift all frames by a specified amount), resource split columns (reduces the "width" of resource data), and map address (replace IP/MAC addresses with symbolic names).

The Module class is an abstract class meant to be derived from and specialized. As such it defines the expected methods that all modules need to implement. Its purpose is to define the protocol of how the pipeline manages or delegates to modules. It is an interface designed to allow the user to define his or her own modules. Because of this, there is little implementation. Instead the basic functionality of each method is described:

Module New—a class method to return a new instance of a derived module. All derived modules are required to implement this to set their own type-specific instance variables, i.e., make the module in a known good state.

Module Open—the module is actually instantiated in the New method. But this is the method that is subsequently invoked. This is the point where any arguments, typically coming from a user interface or command line, that are intended to be used directly by this module are processed.

Module Is Compatible—make sure that this module has any required support modules in the pipeline. This in invoked by the pipeline management logic whenever a new module is inserted into the pipeline. This is a simple way to keep the user from putting two modules into the same pipeline that conflict with each other.

Module Preflight—check to see that this module has all required inputs prior to staring data conversion. Modules will typically complain fatally or with a warning that required arguments either aren't present or have the wrong or inconsistent values. Some modules also search the pipeline to make sure that any required support modules are also in the pipeline. This is one of the last methods invoked just before the data begins to flow down the pipeline.

Module Execute—take a given bundle as input and process its data. This is the workhorse method that actually performs some specific function for this module. It is repeatedly invoked, once per bundle of data until the data stream is exhausted.

Module PreClose—method is invoked as part of shutdown, prior to all files being closed. Some types of modules will buffer up data as part of their processing. This method gives them a chance to purge their buffered data to downstream modules for last-minute processing.

Module Close—method is invoked as the last step when a pipeline is shutting down. At this point, its too late to actually pass data along; PreClose is used for that. Instead some modules will actually go to the output file, which has been saved to disk by this point, and modify the data in that file. This is how the transaction report modules colorizes the standardized data, for example.

Module Describe—return a help description for this module. Modules are required to return a string that explains how this module is to be used and any appropriate values for input arguments.

A visualization of the data pipeline of the preferred embodiment of the invention can be seen in FIG. 1. In use, the data collection tools and converters are synchronized by the user "pinging" each machine in the network and requesting synchronization to a single machine's internal clock. The network sniffer or converter tools are then employed at step 10 to gather network and resource data. Various subroutines are employed here by the pipeline to convert a wide variety of data forms into a standard line format, delineated by commas. The data, which is received in various different formats, is then arranged in files containing lines of data at 15. Mutator 1, shown at 20, then changes each bundle of data to a set of arrays as shown at 25. If the data consists of network traces, then the arrays are arranged in network standard format. If the data consists of resource data or application data, then the arrays are arranged in resource standard format. The arrays are then mutated at 30 into hash tables 35 so that data may be addressed by column header as opposed to row and column location in the array. At position 40 in the pipeline, data from network traces is referred to as a business transaction recognition algorithm as will be further described. If the data is resource data, then it is referred from the pipeline to a file to be used later at 45.

A module may, at any point along the pipeline, request an additional instance of the pipeline be created, resulting in simultaneous multiple analysis threads.

The data pipeline, element, and stream mutation design have many advantages. The data pipeline is efficient. The data being streamed through the pipeline typically has a large volume so it's important to perform all calculations in one pass through the data. Because pipeline elements are relatively independent of each other, and because the pipeline execution mechanism is independent of the pipeline elements, any number of processing steps can be performed in a single pass down the pipeline. Thus, for example, a user might execute several filters and generate several types of reports in one pass over the data.

The data pipeline is configurable. The scope of function for each pipeline element is focused and well-defined. Smaller, well-focused elements can be successfully combined to implement larger tasks. The ordering and presence of particular elements is determined by the end user at execution time; it can vary from run to run.

The data pipeline is extendible. The responsibility is well-contained and the interface is well-defined for each pipeline element. Each element has a specific function. End users can modify pipeline elements. The configuration mechanism is via a "command line", which allows the user to invoke pipeline elements that are not built into the preferred embodiment of the invention.

At the end of the data pipeline, the hash tables are sent to two different algorithms, depending on the type of data received by the converter. If the data in the pipeline is network trace data the pipeline sends the hash table to a transaction recognition algorithm. If the data in the pipeline is resource or application data, the pipeline sends the hash table directly to an output file to be retrieved and the data therein used by the application model generator tool.

The transaction recognition algorithms used in performance profiler have four functions: to recognize transactions from low-level network trace data, to deduce transaction parentage among those recognized transactions, to reduce the number of transactions by filtering extraneous packets, and to aggregate the data to reduce the number of transactions.

A transaction is a logical request paired with an associated logical reply. A request and reply may be derived from one or more frames of low-level data. The transaction recognition algorithm also reduces the low level data by discarding acknowledgement-only frames and combining related request and reply frames.

The low-level or "Sniffer" data is provided to the pipeline by data converters which translate raw data from network traffic capture tools like Network Associates' SnifferPro or Microsoft's Netmon. The low-level data features a frame-by-frame sequence of the data packet traffic among different computers, along with various properties, like packet sizes and protocols. These trace data is voluminous and contains traffic which is not of particular interest to someone examining the captured data.

When designers and maintainers of computer networks work with a network and its associated software, they think in terms of "business functions," as these most directly represent the end user's task at hand. Establishing the chain of parentage is crucial to a higher-level abstraction representing the "business function."

The transaction parenting function or the transaction recognition algorithm associates the low-level packet data by assigning "causality" among transactions. Causality results when a first transaction initiates a sub-transaction, which in-turn initiates other sub-transactions. A transaction which initiates a sub-transaction is deemed a "parent" transaction. A newly initiated sub-transaction called a "child" transaction. A parent-child relationship can exhibit nesting, which corresponds to synchronous transactions spanning multiple computers (or "tiers") in a network.

Transaction recognition involves processing potentially large network trace files, resulting in large numbers of transactions. These large numbers can result in large, more complex simulation models. One technique for reducing this problem is transaction aggregation. Aggregation involves combining multiple, numerous smaller transactions and replacing them with one or more larger transactions, which still exhibits simulation fidelity to the original numerous transactions.

In greater detail, the transaction recognition algorithm is input a sequence of frames from the pipeline, where each frame represents the communications of a packet of information from one computer address to another on the network. For instance, a software application might make a request for some information to another software application across the network, which will reply with some information. Due to the nature of network protocols, the request and reply might be "broken up" into one or more packets. There are usually acknowledgement packets and intervening packets for incidental network activity.

The goal is to recover the original request and reply at the software application level. The challenge in processing this data is to discard incidental traffic, discard acknowledgement packets required by the network protocol, and reassemble the fragmented request and reply.

Recognition of transactions can occur at different levels, depending on the protocol. In the case of TCP, a "three way handshake" is recognized to establish the orientation of the transaction, that is, which address is the requester and which is the replier. However, the presence of these handshake frames is not guaranteed. Therefore, the first substantial communication is assumed to be from the requester. This assumption of the algorithm can be overridden by the user who may supply a list of known requester addresses as an auxiliary input to the algorithm.

The transaction recognition logic allows for a request to take one or more frames. As long as the frames are from the requester to the replier, they are accumulated into the same logical request. When the direction of the communications switches from replier to the requester, frames are accumulated into the same logical reply. If the flow reverses, the transaction is closed and a new transaction is opened. Acknowledgements frames, which have zero payload, are recognized and filtered out to avoid spurious fragmentation of a transaction into multiple smaller transactions.

Figure 2A:
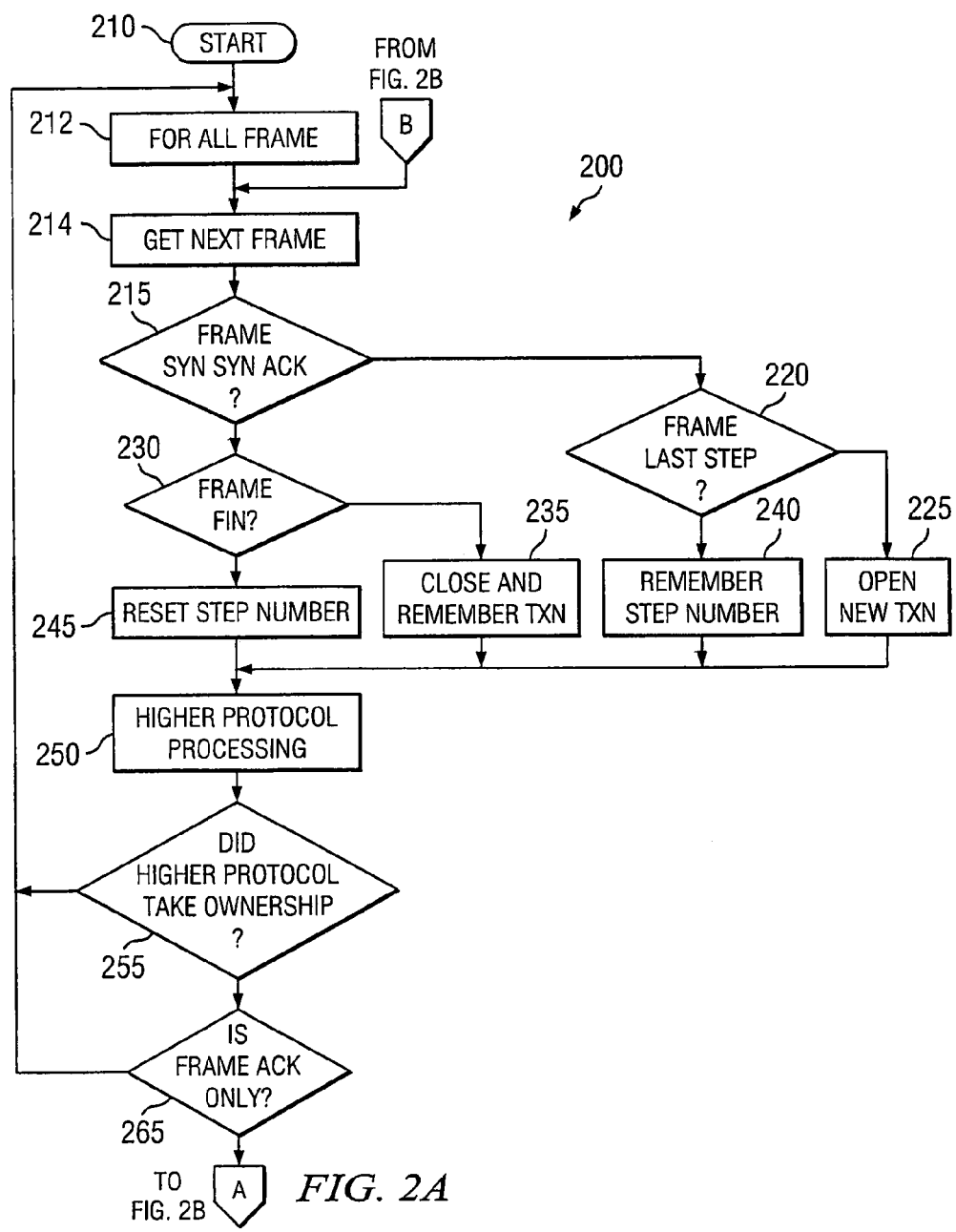
FIGS. 2a and 2b are a flow chart of the logic of the transaction recognition algorithm of the preferred embodiment of the invention.
Figure 2B:
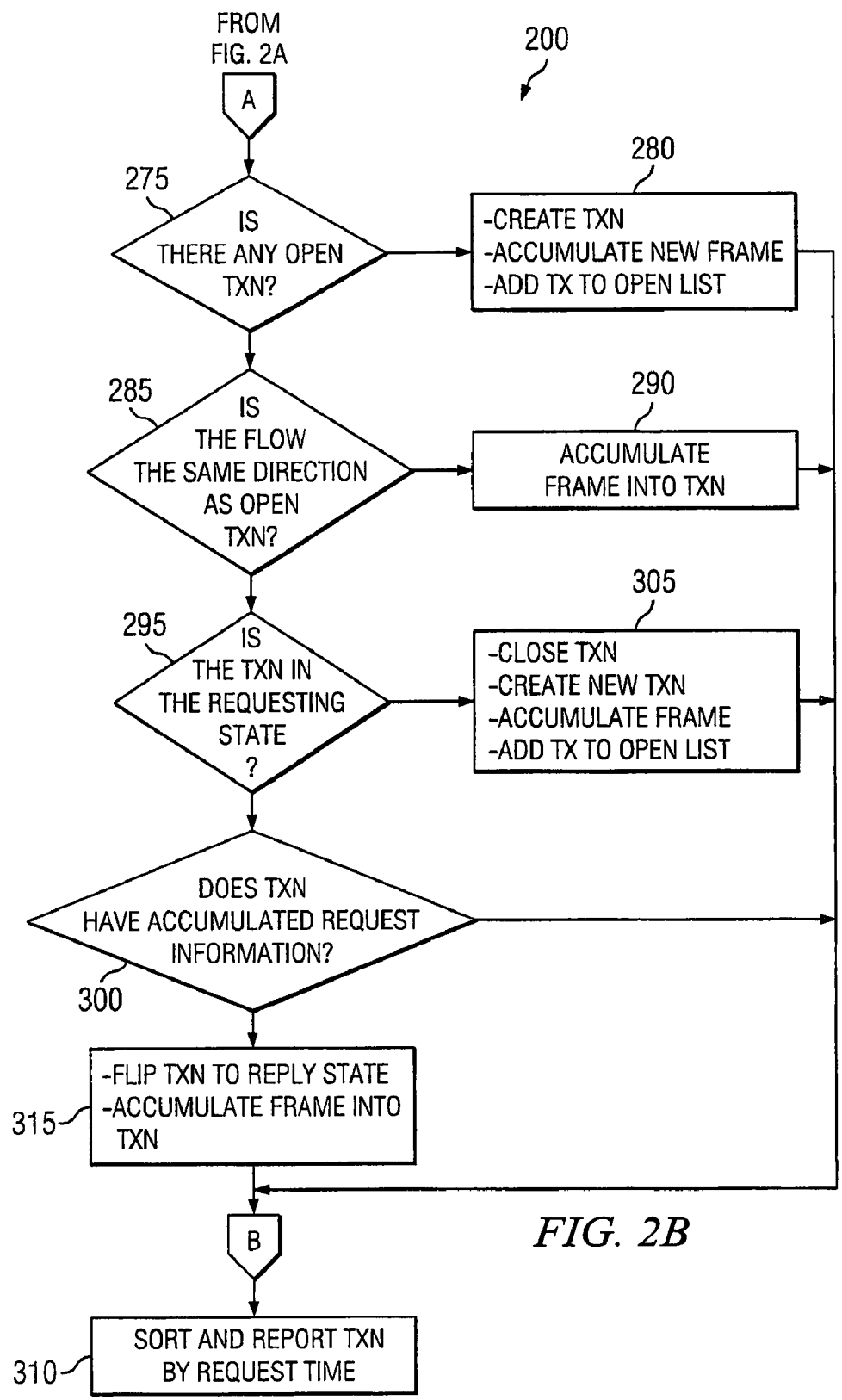

The logic of the transaction recognition algorithm of the preferred embodiment takes the form of that shown in FIGS. 2 and 2b. The algorithm enters at the start block 210 proceeding directly to set up a loop at 212 and get a next frame at 214. At frame 215 the frame is analyzed to determine whether or not it is apart of a TCP SYN-SYN-ACK packet. If so, the algorithm proceeds to block 220 where the frame is analyzed to determine if it is the last step in the transaction. If so, a new transaction is opened at block 225 and the program proceeds to higher protocol processing at block 250. Higher protocol processing includes processing of HTTP, FTP and MQSERIES packets as examples. The protocol processing consists of detecting protocol tags, ports involved and other custom parameters of the particular higher protocol. For example, requests and replies can assume different port numbers. These port numbers must be checked to determine transaction recognition. Knowledge of the higher protocols is known in the art. If the frame is not the last step at block 220, the program proceeds to step 240 to remember this step number and then proceeds to higher protocol processing in step 250.

If the frame is not an SYN-SYN-ACK packet the program queries if the frame is an FIN TCP packet in step 230. If so, the algorithm moves to step 235 and closes and remembers the transaction before proceeding to higher protocol processing in step 250.

If the frame is not an FIN frame the program moves to step 245 where the step numbers reset before proceeding to step 250 and higher protocol processing.

After higher protocol processing, the program queries whether higher protocol took ownership of the transaction in step 255. If so, the program advances to the next frame at returns to step 212 to get a next frame at 214 to begin processing again. If the higher protocol did not take ownership of the transaction by requiring additional processing to determine recognition at step 255, then the program analyzes the frame to determine if it was an acknowledgment only in step 265. If so, the program proceeds to the next frame in step 270 and then returns to step 212.

Proceeding to FIG. 2b, if the frame is not an acknowledgement only for 265, then the program queries to determine if there is an open transaction in step 275. If so, the program determines at step 285 if the flow of the transaction is the same direction as the current open transaction. If so, then the frame is accumulated into the transaction at step 290 and then proceeds to sort and report the transaction by request time in step 310. If the flow is not in the same direction as the open transaction in step 285, the program then queries if the transaction is in the requesting state. If so, the program queries if the transaction has accumulated request information in step 300. Control returns to 214 unless the transaction is last. If so, the transaction is sorted and reported by request time in step 310. If not, the transaction is changed at the reply state and accumulated into the frame at step 315.

If the transaction is not requesting state at step 295, the program closes the transaction, creates a new transaction, accumulates the frame into the current transaction and applies the transaction to the open list at 305 before proceeding to step 214 or 310 to sort and report the transaction by request time of the transaction is last.

If there is not an open transaction at step 275 then the program creates a new transaction at step 280 accumulates a new frame and adds a transaction to the open transaction list before proceeding to return to get a next frame at step 214. If all transactions have been processed, then control goes to step 310 to sort and report the transaction by request time.

Once a list of transactions has been recognized from the low-level frame-based data, the algorithm begins to determine transaction "parenting". Transaction "parenting" is a process of narrowing down the potential parent transactions until a best candidate is found. Three important properties of transactions are measured as part of the parenting process: "encloser," "busy," and "closeness".

A synchronous transaction has a starting time (when the request first occurs) and an ending time (when the reply last occurs). The time interval from the starting to the ending time is referred to as the "span". One transaction fully "encloses" another transaction if the first transaction's starting time is on or before the second transaction's starting time and the first transaction's ending time is on or after the second transaction's ending time. One transaction "partially encloses" another transaction if the first transaction's starting time encloses the second transaction's starting time but the second transaction's ending time is not enclosed.

To be in a "busy" state, a transaction must have at least one child transaction. The span of that child must enclose the time point of interest. In other words, a parent transaction is "busy" during the span of each of its child transactions.

"Closeness" is a measure of which of another transaction's starting time is nearer to the candidate transaction.

During execution the algorithm assigns preference to potential parent transactions in order of the "non-busy" transactions, the transactions which fully enclose the candidate, and finally those that partially enclose the candidate. Note that if there is no enclosing at all, a given transaction is not considered in the parenting process.

Figure 3A:
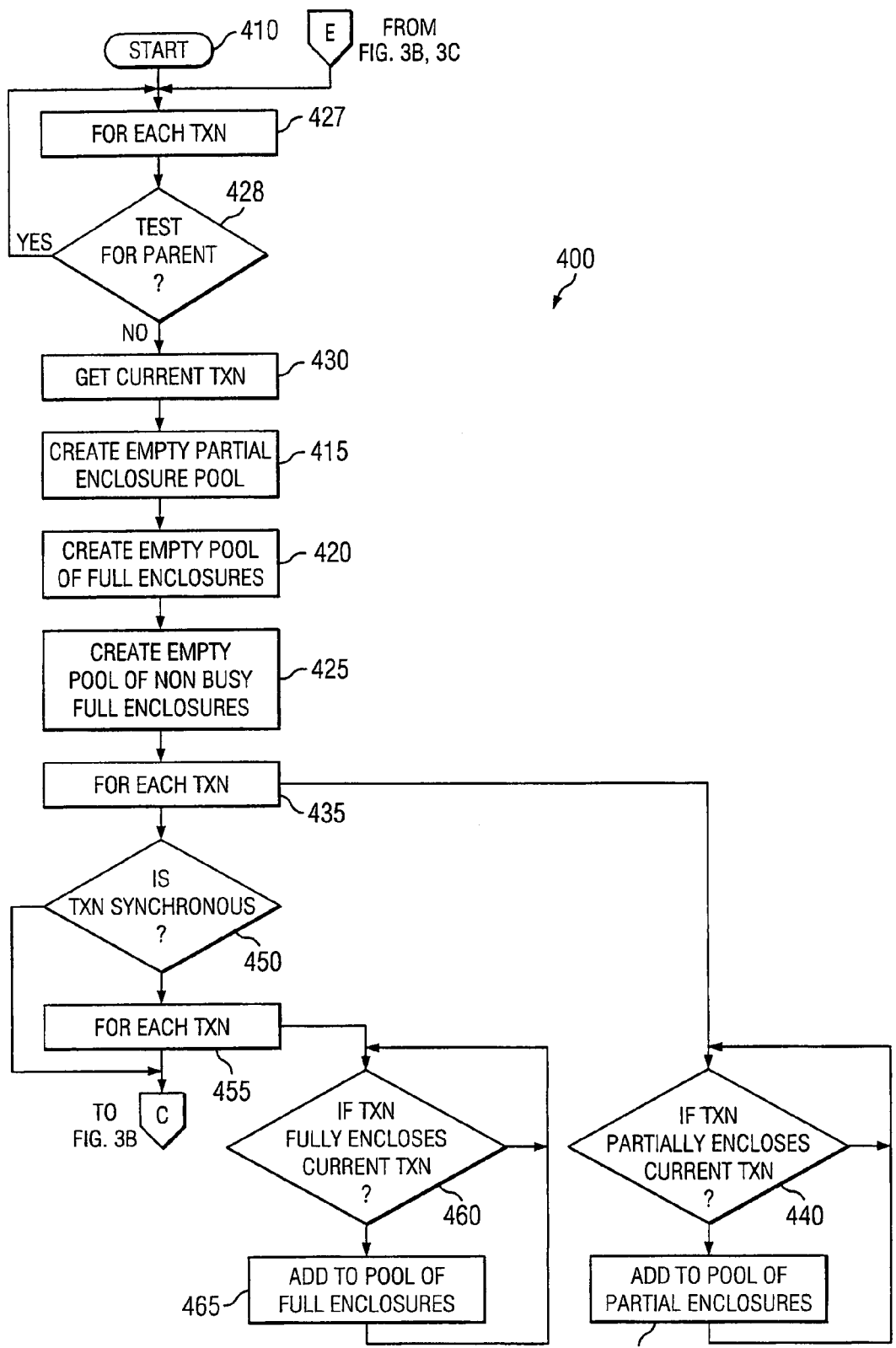
FIGS. 3a, 3b and 3c are a flow chart of the logic of the parenting algorithm of the preferred embodiment of the invention.
Figure 3B:
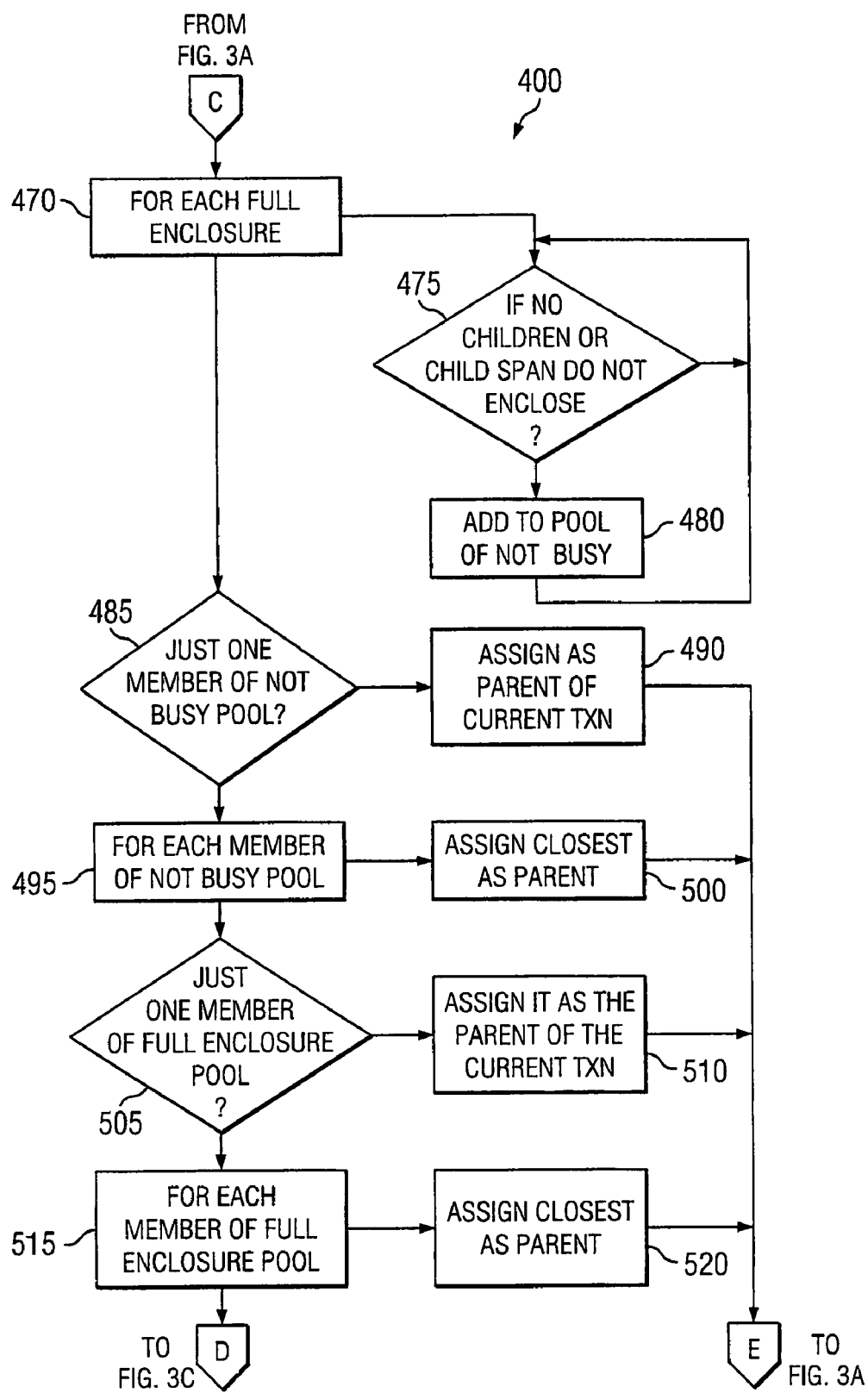
Figure 3C:
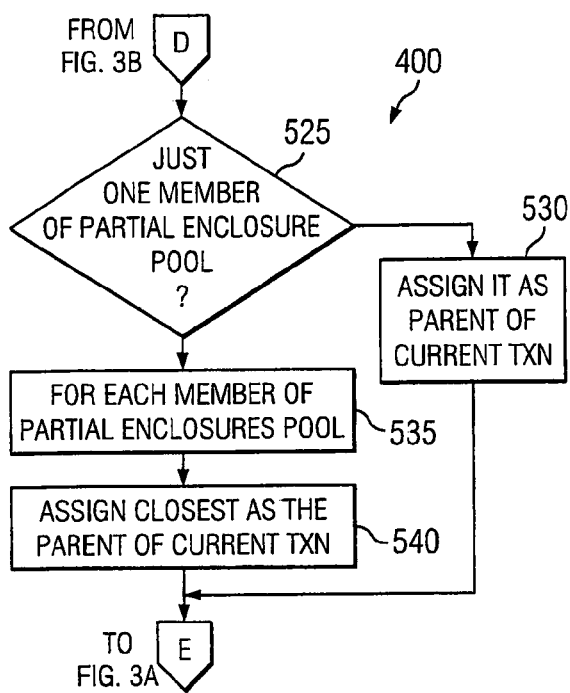

The logic of the parenting algorithm can be visualized by referring to the flow chart at FIGS. 3a, 3b and 3c. The parenting algorithm 400 starts at block 410 and immediately moves to obtain a next transaction at step 427. The program then checks to see if the current transaction has a parent at step 428. If so, it returns to step 427. If not, it moves to step 430 to create an empty pool for partial encloser, an empty pool for full encloser and an empty pool for non-busy full encloser at steps 415, 420 and 425. The program then selects a current transaction at step 430 and enters a loop at 435.

At loop 435 for each transaction, the program checks to see if the transaction partially encloses the current transaction at step 440. If so, at step 445 the program adds the transaction to the pool of partial encloser and returns to get the next transaction at step 435. If the transaction is not partially closed at step 440 the program returns to get the next transaction at step 435. After loop 435, the program moves to step 450 where it checks to see if the current transaction is synchronous. If the transaction is synchronous it enters a loop at step 455 to check to see if the transaction is fully enclosed, at 460. If so, transaction is added to the pool of full encloser at step 465 where control returns to step 455 to pick the next transaction. If not, the current transaction is not added to the pool of full encloser and control again returns to step 455 for a next transaction.

After completing 455 the program moves to step 470, shown in FIG. 3b, and enters a loop. At loop 470 for each transaction in the list of full encloser, the program checks to see if the current transaction has no children or if all the children spam's do not enclose the current transaction request time at step 475. If so, step 480 the current transaction is added to the pool of not busy transactions and the loop continues at step 470 for the next full encloser transaction. If the transaction has children, or if the children spam do enclose the current transaction request time, then step 480 is skipped and control returns back to get the next transaction which is a full encloser step 470.

After completing step 470 the program proceeds to step 485 to determine if there is just a single member of the not busy pool at step 485. If so, at step 490 the program assigns the transaction as the parent of the current transaction in step 490 and returns to get another current transaction at step 427. If there is more than one member of the not busy pool at step 485, then for each member of the not busy pool at step 490, the program enters a loop to assign it as the parent of the current transaction at step 500. After this loop is completed control is returned to get a next current transaction at step 427.

After step 495, the program checks to determine to see if there is just one member of the full encloser pool at step 505. If so, it is assigned as the parent of the current transaction at step 510 and control is returned to step 427. If not, the program enters a loop at step 575 and assigns parentage to each member of the full encloser pool at steps 515 and 520. After step 520 control returns to step 427.

Continuing onto FIG. 3c after loop 515, the program determines if there is just one member of the partial encloser pool at step 525. If so, it is assigned as the parent of the current transaction at step 530 and control is returned to step 427. If not, the program enters a loop for each member of the partial encloser pool at step 535. For each member of the partial encloser pool, the program assigns the closest as the parent of the current transaction at step 540 and then returns control to step 427.

An optional aggregation algorithm is provided in the preferred embodiment which also serves to minimize a number of transactions which must be processed in a simulation model. It cooperates with the transaction recognition algorithm by accepting as input transaction reports. The transaction reports will contain hundreds or even thousands of transactions and therefore when loaded into a model or simulator it will take an extremely long time to run. The aggregation routine of the current invention reduces simulation time while preserving the results of the simulation by "aggregating" transactions which can be added together without compromising the accuracy of the simulation.

Only certain transactions can be aggregated. First, in order to be a candidate for aggregation, a transaction must have no children (a "leaf" transaction). Additionally, the aggregation candidate must be produced by the same tier and have the same parent. For example, if a transaction begins at computer A and moves to computer B who initiates a child transaction to computer C, who responds to computer B whereupon B responds to computer C and C responds to B again before B responds back to computer A, and this entire pattern is repeated again, then there are four childless transactions between computers B and C. These four transactions are candidates for aggregation because they themselves have no children, exist on the same tier between computers B and C, and have the same parent transaction. The four transactions are aggregated into two transactions between computer B and computer C. The properties of the two original transactions from computer B to computer C, including payload size, request size, reply size, response time, service time, request frame count and reply frame count, service time, are added together to form an aggregate transaction. The aggregation results in two transactions which, when substituted into the transaction report and supplied to the model simulator, behave in the simulator in the same manor as the four original transactions, but with half the simulation time required.

The aggregation algorithm allows a parameter "N" aggregation count to be set by the user. The aggregation count allows the user to limit the aggregation accomplished by the aggregation algorithm to a multiplier. In practice, the parameter "N" allows the aggregation of any integer number "N" of transactions to be aggregated into a single transaction from the pool of acceptable candidates. In practice, the aggregation algorithm is accomplished after the parenting algorithm has completed and operates on and changes the transaction report it receives as inputs from the parenting algorithm, producing a new transaction report as output.

Figure 4:
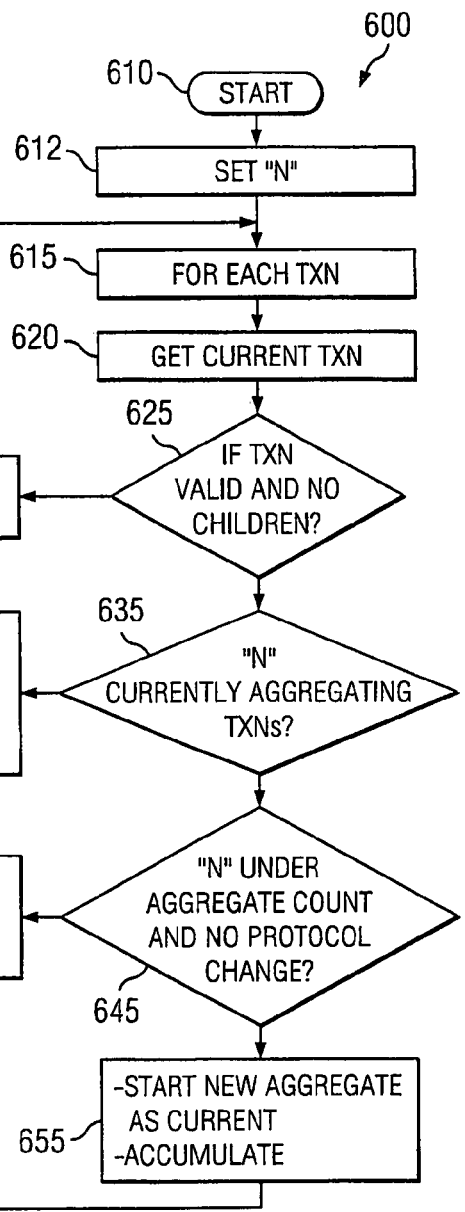
FIG. 4 is a flow chart of the logic of the aggregation algorithm of the preferred embodiment of the invention.

The aggregation algorithm is shown in a flow chart in FIG. 4, at 600. Referring now to FIG. 4, the algorithm starts at step 610 and immediately moves to step 612 where it queries the user to set the aggregation count "N". The algorithm then enters a loop for each transaction at 615 and proceeds to get the current transaction 620 before proceeding to the decision node 625. At 625 the program determines if the transaction is valid, i.e. if it meets the required rules for aggregation and that it has no child transactions. If so, it moves to step 635 where the algorithm checks to assure that it is currently aggregating transactions. If so, it moves to step 645 where it checks to see if it still under the aggregation count "N" and that there is no protocol change in the transaction. If so, it accumulates the transaction under the current aggregate at step 650 and returns to get a second transaction at step 615. If the aggregate count has been exceeded or if there is a protocol change, at step 645, the program moves to step 655 where it starts a new aggregate, sets it as current and accumulates the current transaction into the current aggregate. The program then advances back to step 615 and chooses the next current transaction. If at step 635 the program is not currently aggregating transactions it starts a new aggregate as current and then it accumulates a current transaction into the current aggregate at step 640. The program then advances to step 615 and chooses a new transaction.

If at step 625 the transaction is not valid or if it has child transactions the transaction is not aggregated and the next transaction is chosen as current in step 615.

An example of the outputs from the performance profiler tool is included as FIGS. 9a and 9b. FIG. 9a represents the left half of a spreadsheet shown in Microsoft® Excel and FIG. 9b shows the right half of the same spreadsheet. The transaction report results from application of the converted, data pipeline, transaction recognition algorithms, data algorithms and aggregation algorithms to the trace data by the performance profiler tool. Referring to FIG. 9a, the transaction report lists trace data arranged according to start time shown as column A, lines 7-24. Column B allows the user to label a particular business function associated with each transaction for each line in the spreadsheet UIAA graphical user interface. In column C, the "caller" is listed according to protocol used. For instance, at column C, line 8, is the caller protocol. If the designation "n/a" appears, the caller is assumed to be the end user since the caller protocol is not available. Column D represents the name of the requesting machine. If no name is supplied by the user, the profiler automatically assigns the name as the protocol used by the requester plus an integer indicating the number of the request. Column E is the requester machine name, column F is the replier machine name. Column G is allowed for user input of various data and can be used for flags. Column H provides for transaction response time defined as the difference in the end of the request time and the beginning of the reply time. The service time at column J is the time required to process the transaction by the replying server.

Moving to FIG. 9b, the reply time shown at column K is the time between the beginning of the reply to the request and the end of the reply. Column L shows the request frame count which is the number of packets required to make the request by the requester. Column M shows the request wire size which is the physical byte size of the request including overhead and protocol. Column N is the request payload size. Column O shows the reply frame count, while columns P and Q show the reply wire size and the reply payload size respectively. Column R indicates the name of the protocol used by the requester and column S provides for "tags" for various user settable flags.

For asynchronous transactions, transaction response time, service time, reply time, reply size, wire and payload are all not applicable as shown in this example at FIG. 9a, line 19.

Figure 12A:
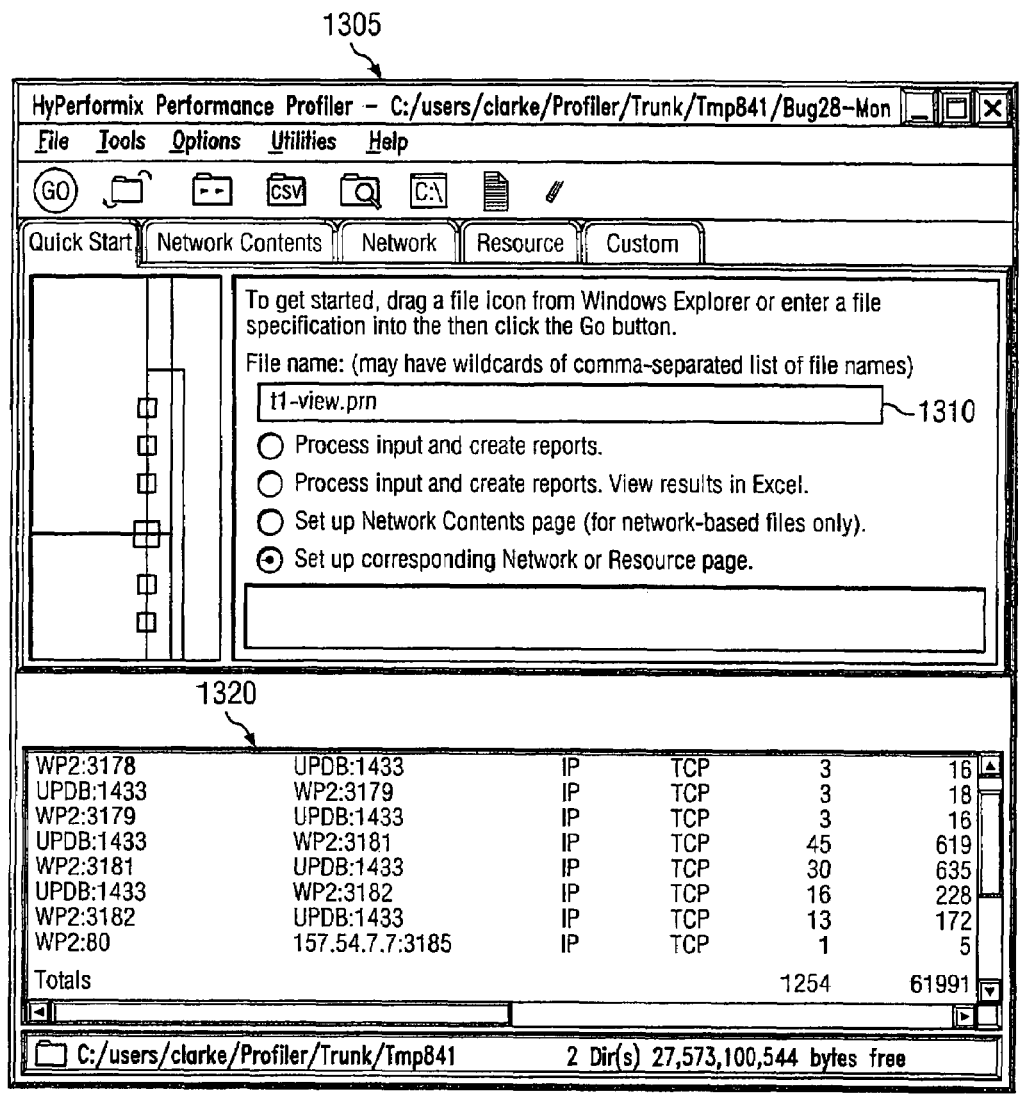
FIG. 12a-12e show the tab-driven graphical user interface of the performance profiler tool of the preferred embodiment of the invention, including sample data.

The functions of the performance profiler tool are carried out in a graphical tab-driven format which is activated by right clicking on a graphical user interface which will be further described later. The tabs which drive the performance profiler functions are "quick start", "network contents", "network", "resource" and "custom". FIG. 12a shows the quick start menu of the performance profiler. Here, the user is allowed to input the raw data file he wishes to analyze from the sniffer data at box 1310. The user may then activate the pipeline of the performance profiler by clicking the "go" button in the upper left-hand corner 1315. Activation of the "go" button from the quick start menu creates standard reports from the type of data; i.e., resource or trace data found in the file. Other files may be added to the model and analyzed by replacing the file in 1310 and again activating the pipeline through button 1315. A scrolling text box is provided at 1320 to show report and status information.

Figure 12B:
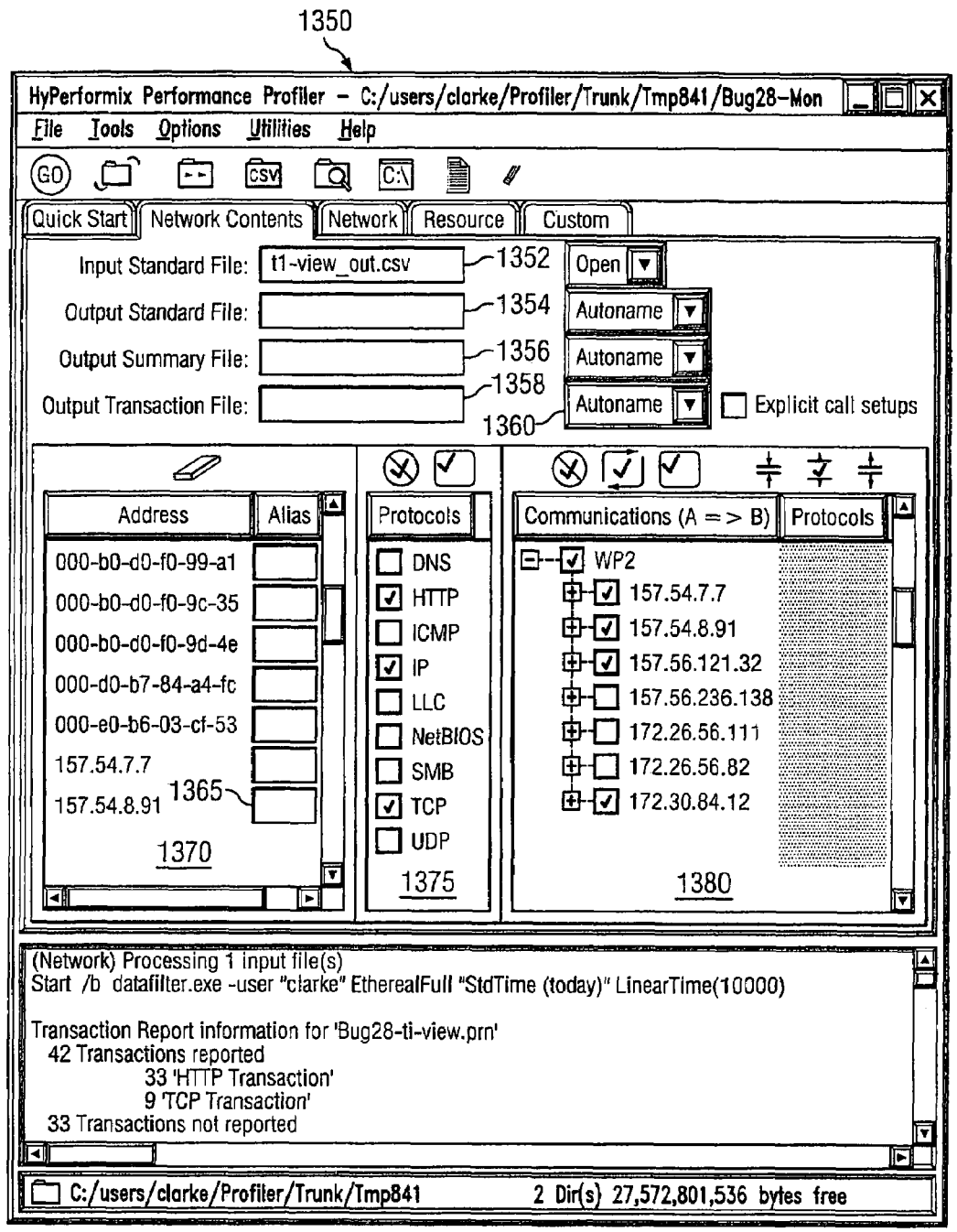

Moving to FIG. 12b, network contents page 1350 allows the user to name certain input and output files at 1352, 1354, 1356 and 1358 or use the auto-name function on any of the files as indicated at 1360. The alias boxes at 1365 allow the user to name computers whose physical addresses are shown at the column 1370. Additionally, the user can allow or disallow the recognition of any set of protocols by checking boxes in column at 1375. Similarly, the user can allow or disallow communications with any computer by checking or unchecking the boxes at column 1380. The choices of the user are executed by clicking the "go" button at 1315.

Figure 12C:
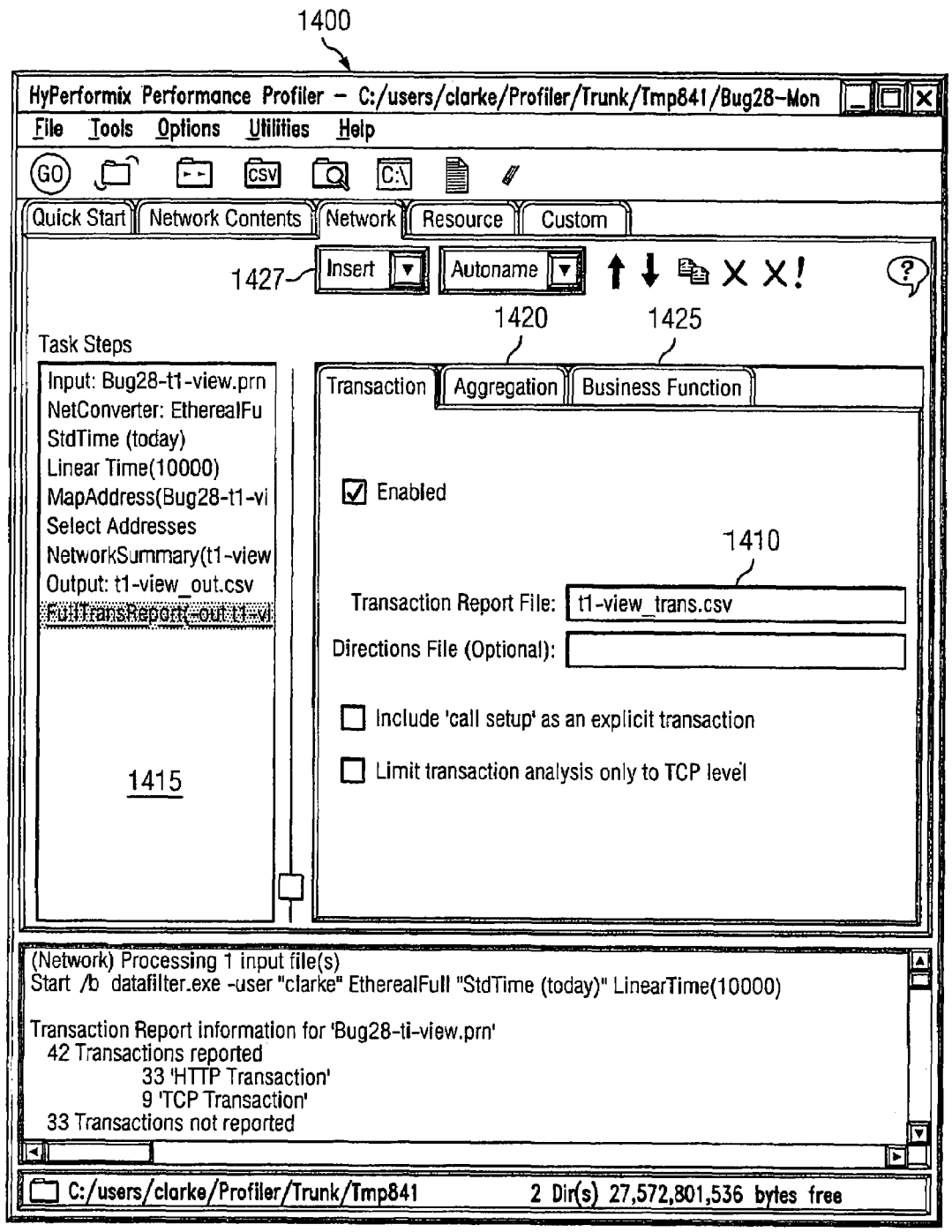

Moving to FIG. 12c, tab 1400 is the "network" tab. In the network tab, the user can name the transaction report file at 1410 and also assign certain task steps for network data at column 1415. A complete drop down list of tasks or filters can be accessed and added at button 1427 to add filters to the data pipeline. Additionally, the user can set certain aggregation parameters for each computer as "N" at subtab 1420 or name certain business functions at subtab 1425.

Figure 12D:
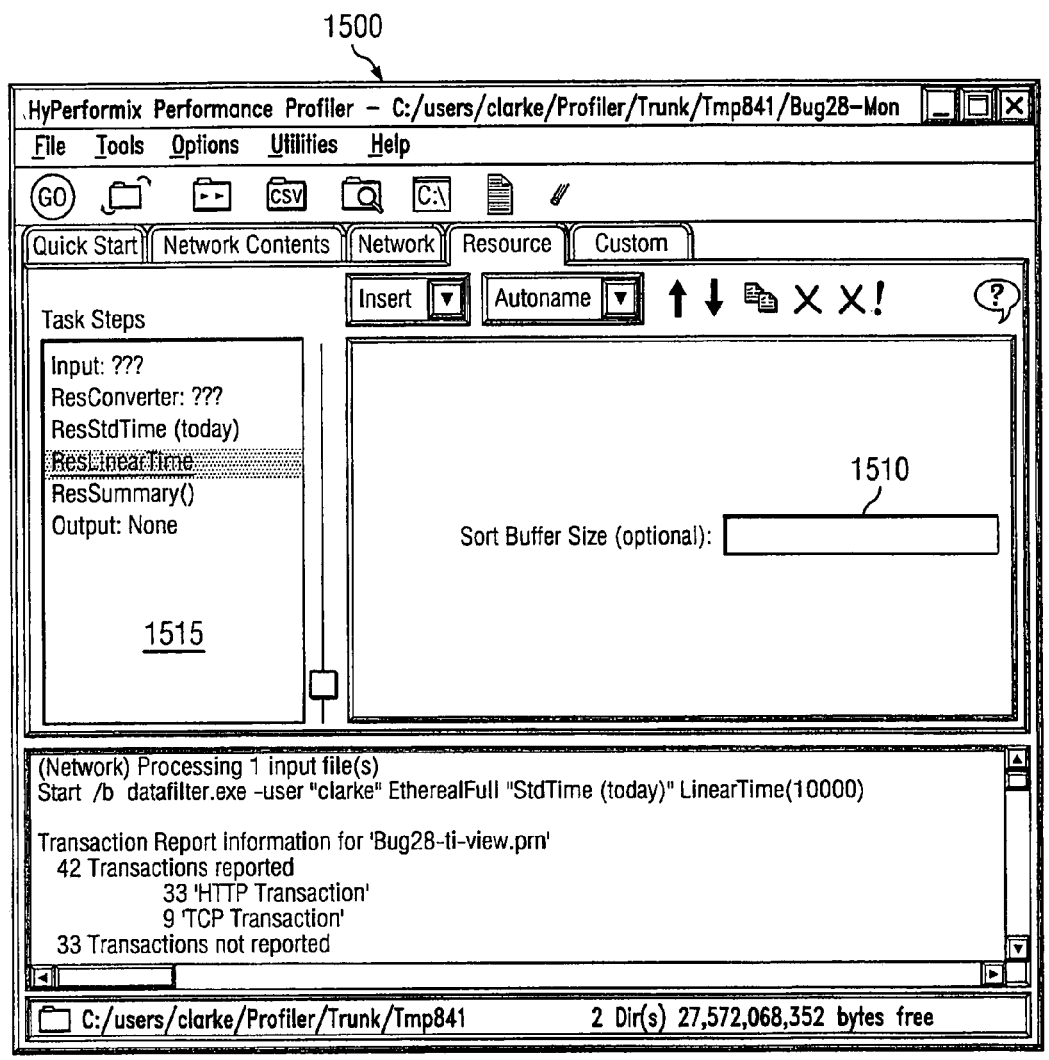

Moving to FIG. 12d, the "resource" tab is shown at 1500. At this tab, the user may set a sort buffer size at 1510 and assign task steps or filters for resource data at 1515.

Figure 12E:
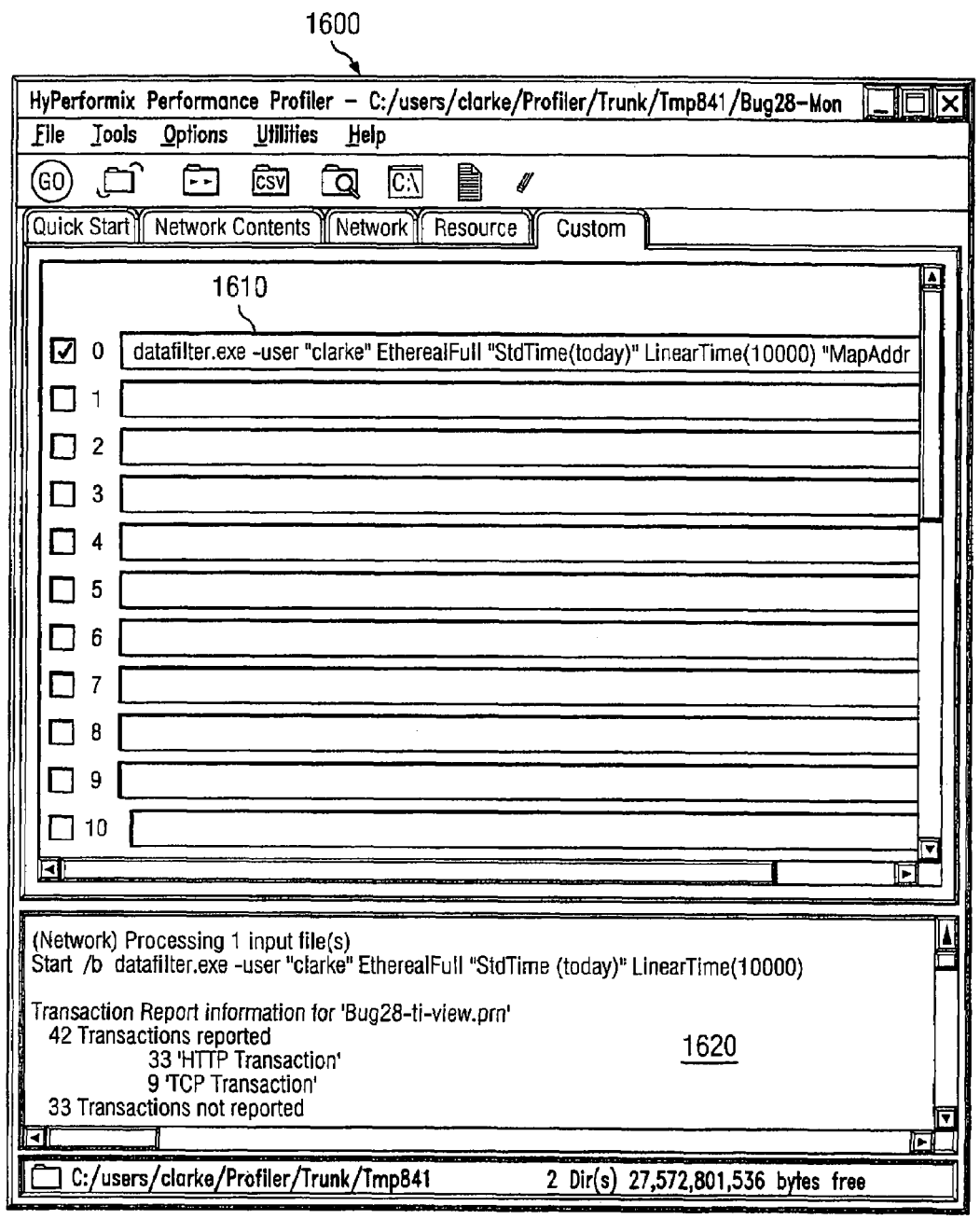
Figure 13A:
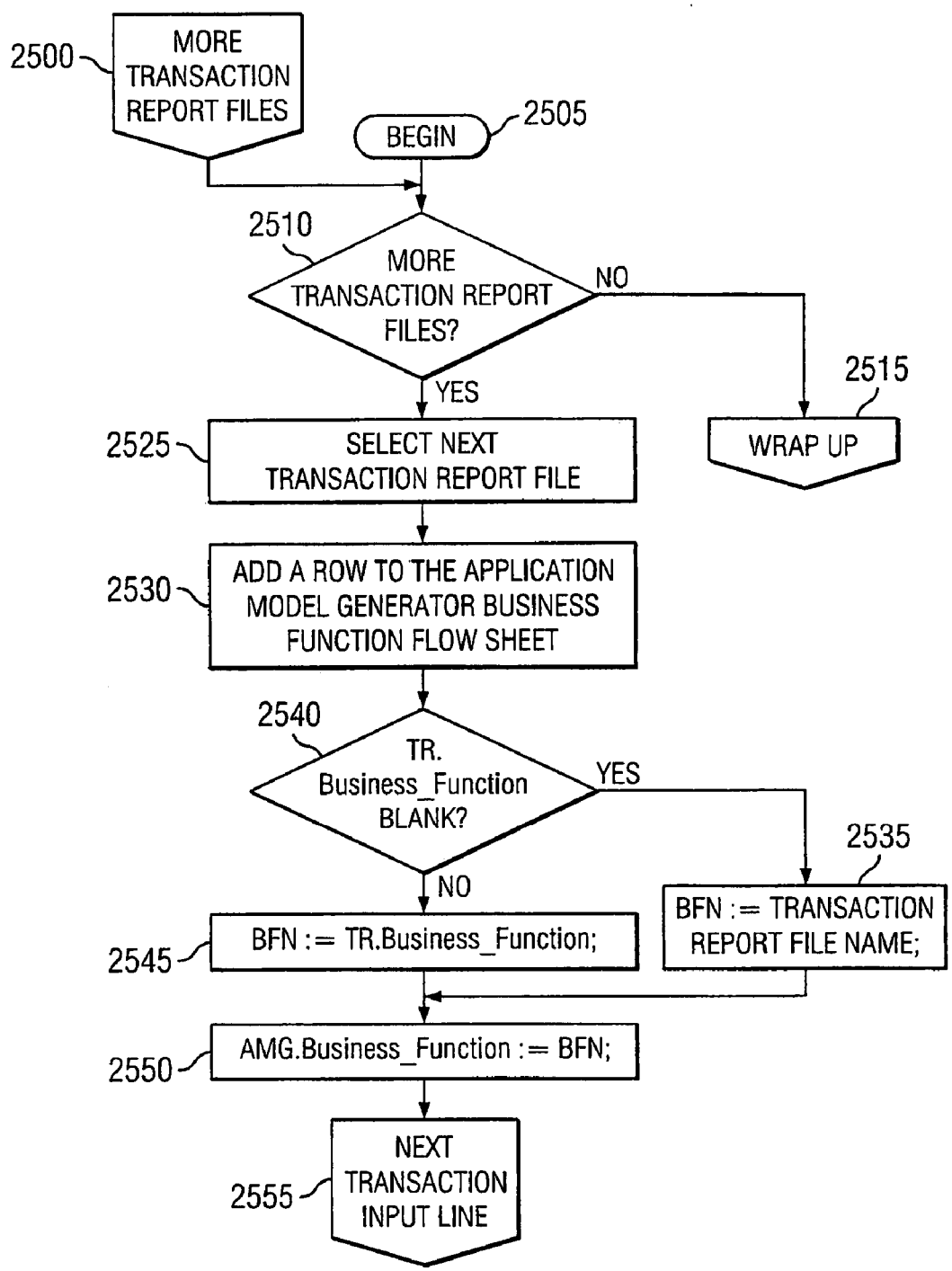
Figure 13B:
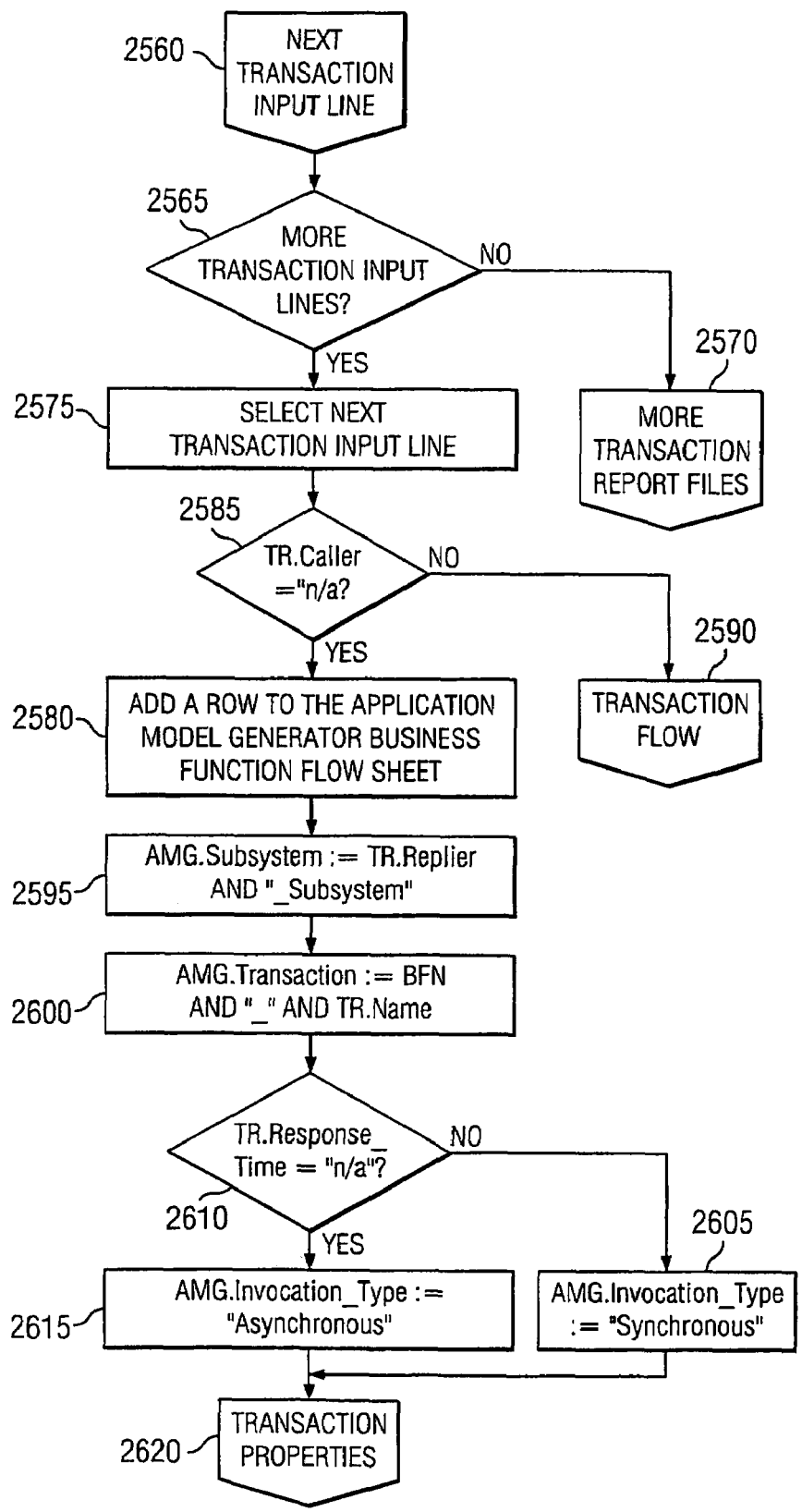
Figure 13C:
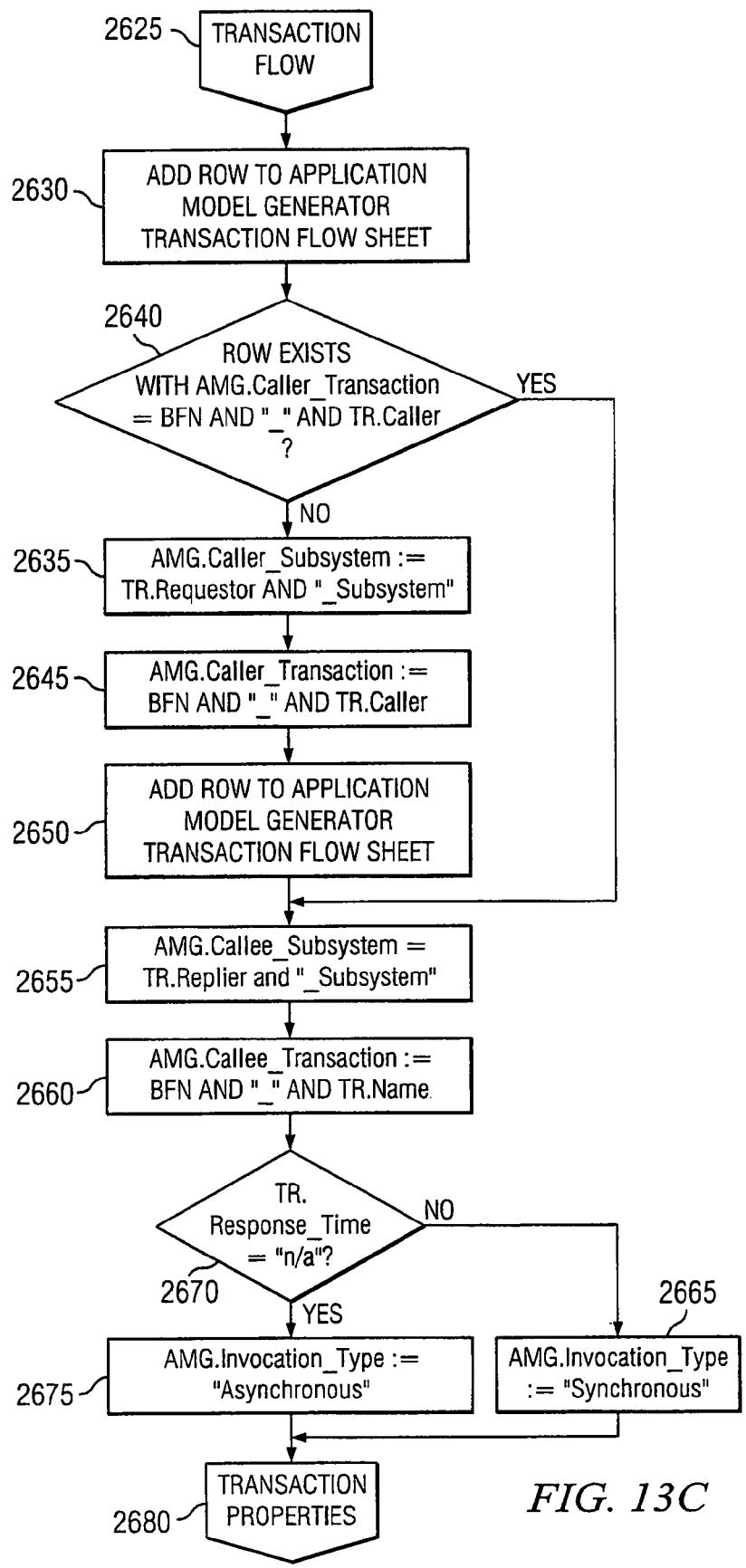
Figure 13D:
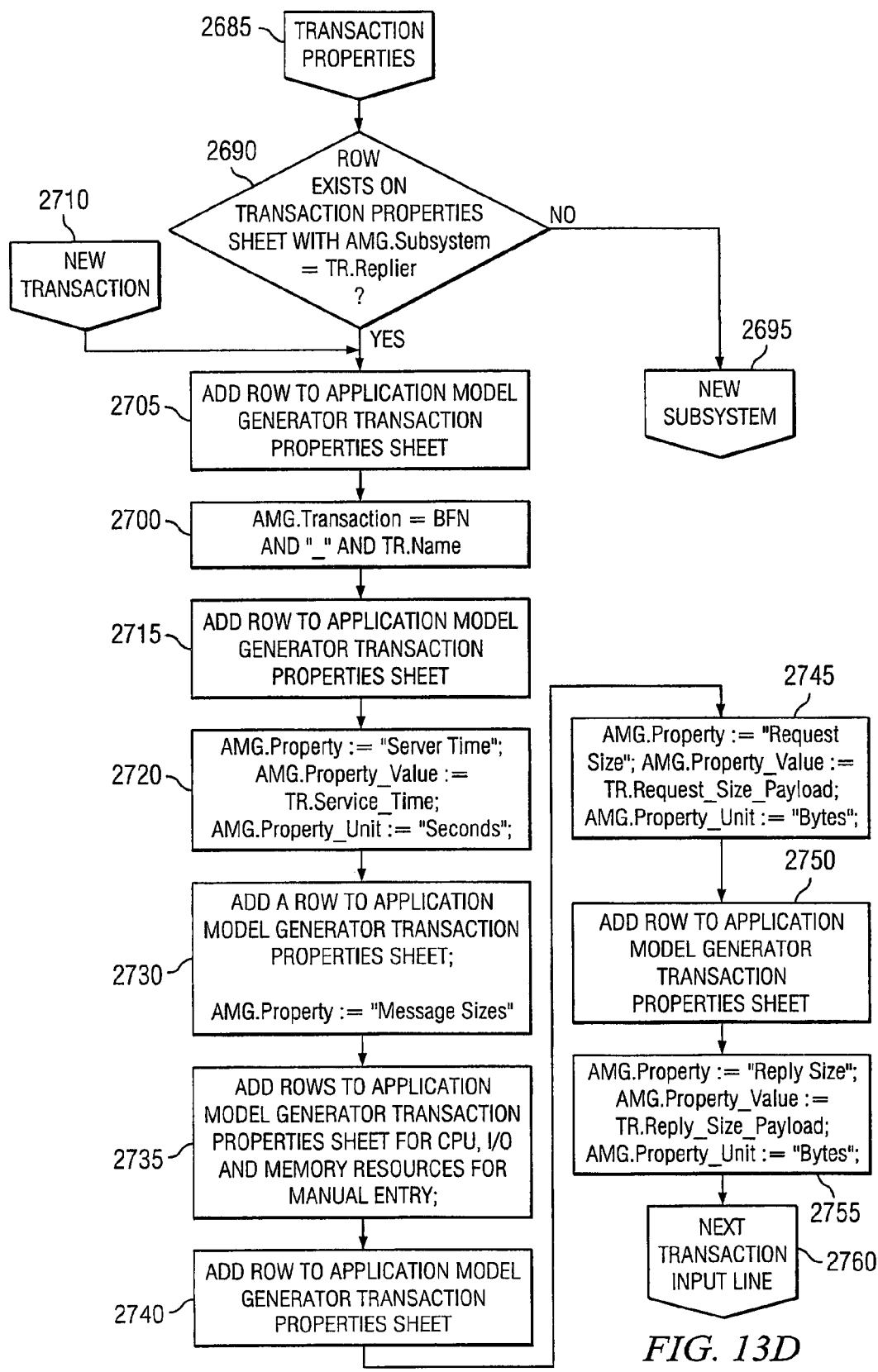

Moving to FIG. 12e, the "custom" tab allows the user to type in commands to be executed upon depressing the "go" button 1315.

The scrolling text box at 1620 appears on each of the "network contents", "network", "resource", and "custom" tabs shown in FIGS. 12b through 12e and show current system status including transactions reported, not reported and analyzed.

The text box at 1315 is also used to report system status.

Data Visualization

After the Performance Profiler has completed its functions in the preferred embodiment, the user has two visual data analysis tools which are provided in the current invention. Data visualization and profiler workflow analyzer.

Data Visualization Tool

In the data visualization tool, the user is provided the ability to review graphical representations of resource standard data and network standard data.

Figure 5:
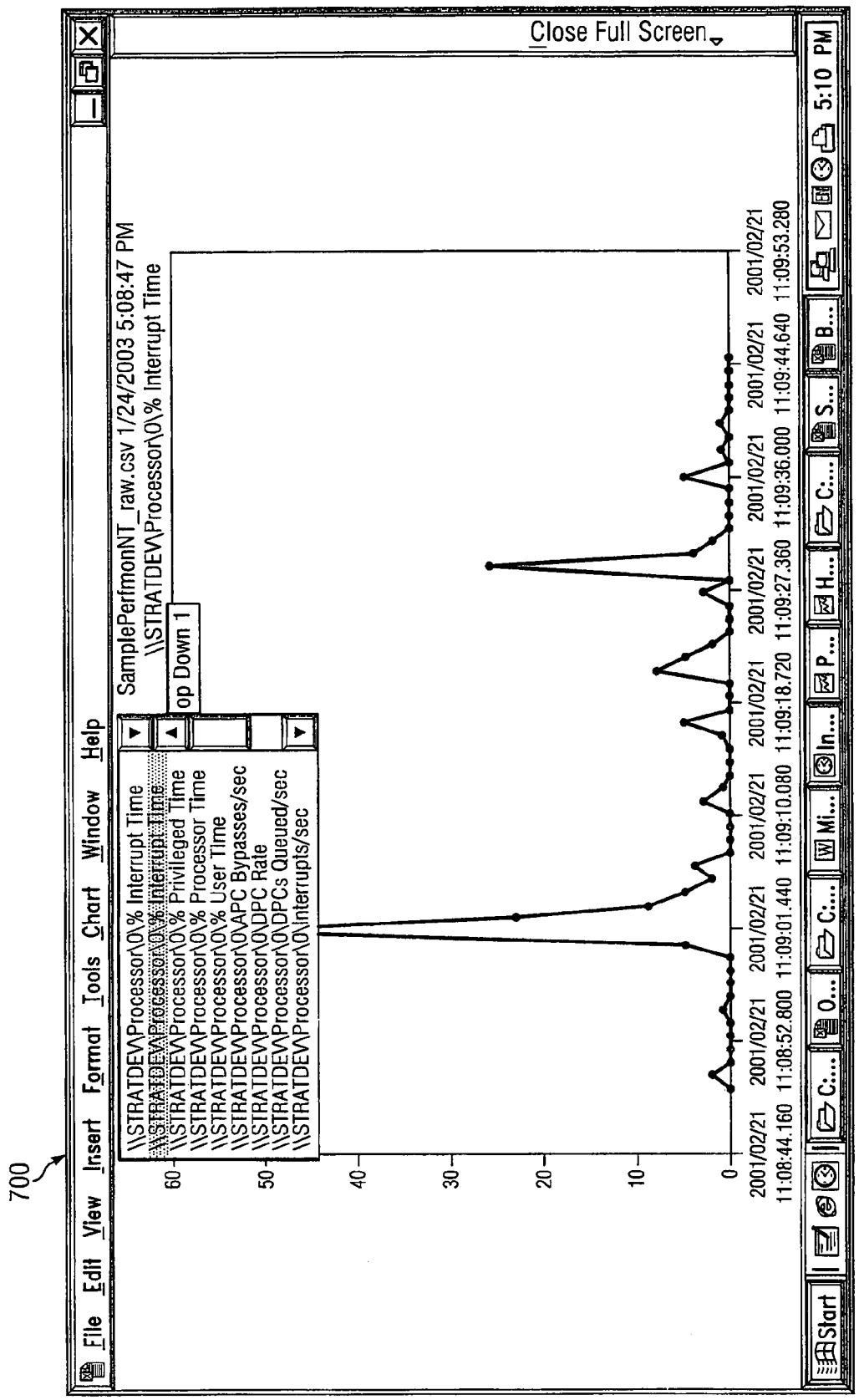
FIG. 5 shows a graphical representation of an example resource standard data file as provided by the data visualization tool of the preferred embodiment of the invention.

FIG. 5 shows a graphical representation of an example resource standard data file as provided in the current invention. The data visualization tool uses standard Microsoft® Excel graphics to represent resource standard data, such as CPU usage, graphed by time and server, monitor tool and chart per server, IO per server and summarization data. FIG. 5 shows, for example, the percentage of processor time in interrupts on the vertical axis and synchronized network time on the horizontal axis. Since resource standard data is provided in the performance profiler, too, in the form of spreadsheets, they can be easily imported into Microsoft Excel as well known in the art. Typical examples of data which can be visualized in resource standard format section of the data visualization module of the current invention is as follows: cpu utilization, memory usage, page fault rates, reads per second, writes per second, disk busy utilization, and others.

Figure 6:
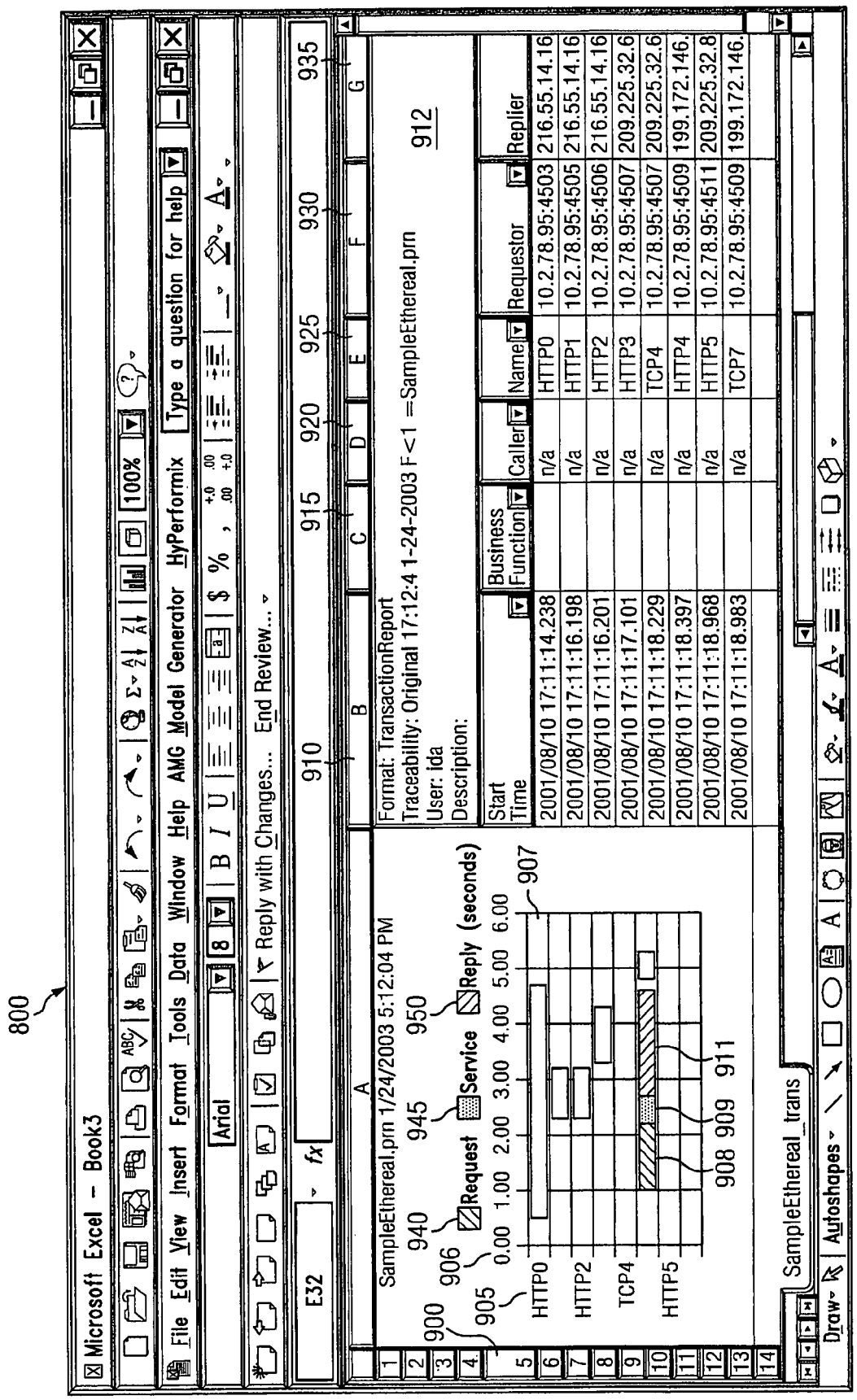
FIG. 6 shows a graphical visualization of the transactions found in a network standard data file for the data visualization tool of the preferred embodiment of the invention.

Network standard data can also be visualized in the data visualization tool of the current invention. FIG. 6 shows the graphical visualization transactions found in network standard data. For instance, referring to FIG. 6 spreadsheet 800 includes a column 900 a reference line number. Time advances along line 5 at 906 showing request time, service time and reply time in seconds as indicated by various colored blocks 940, 945 and 950, represented in FIG. 6 by differing hash marks. 905 is the name of a transaction (not server names). The display area 907 graphically displays request time, service time and reply time in seconds as bars in graphical area 907 per transaction 905. For instance, bar 908 would indicate that a transaction TCP 4 had made a request at time 1 which went to approximately time 2.25 where it ended. Service time between the request and the reply is shown at 909 at approximately 2.25-2.75 seconds. At block 911 reply time is shown to occur between approximately 2.75 and 4.5 seconds. In the right hand display area 912, the graphical display can be seen to show six columns 910, 915, 920, 925, 930 and 935. Column 910 includes start time and date, column 915 includes a business function name, supplied by the user, column 920 includes a caller, column 925 includes a transaction name, column 930 includes a requester address and column 935 includes a reply address. Other data available in window 912, but not shown in FIG. 6 include transaction response time, service time, reply time, frame count and request and reply size.

Work Flow Analyzer Tool

The invention also includes the workflow analyzer graphical analysis tool. The workflow analyzer tool integrates the network traffic contained in the network trace files (server-to-server communications) and the resource consumption (process, disk, or IO data) contained in the resource data files as a single workflow diagram. The workflow analyzer tool uses the combined output trace files generated by the performance profiler tool as an input to arrive at a combined graphical output, as will be further described.

Figure 7:
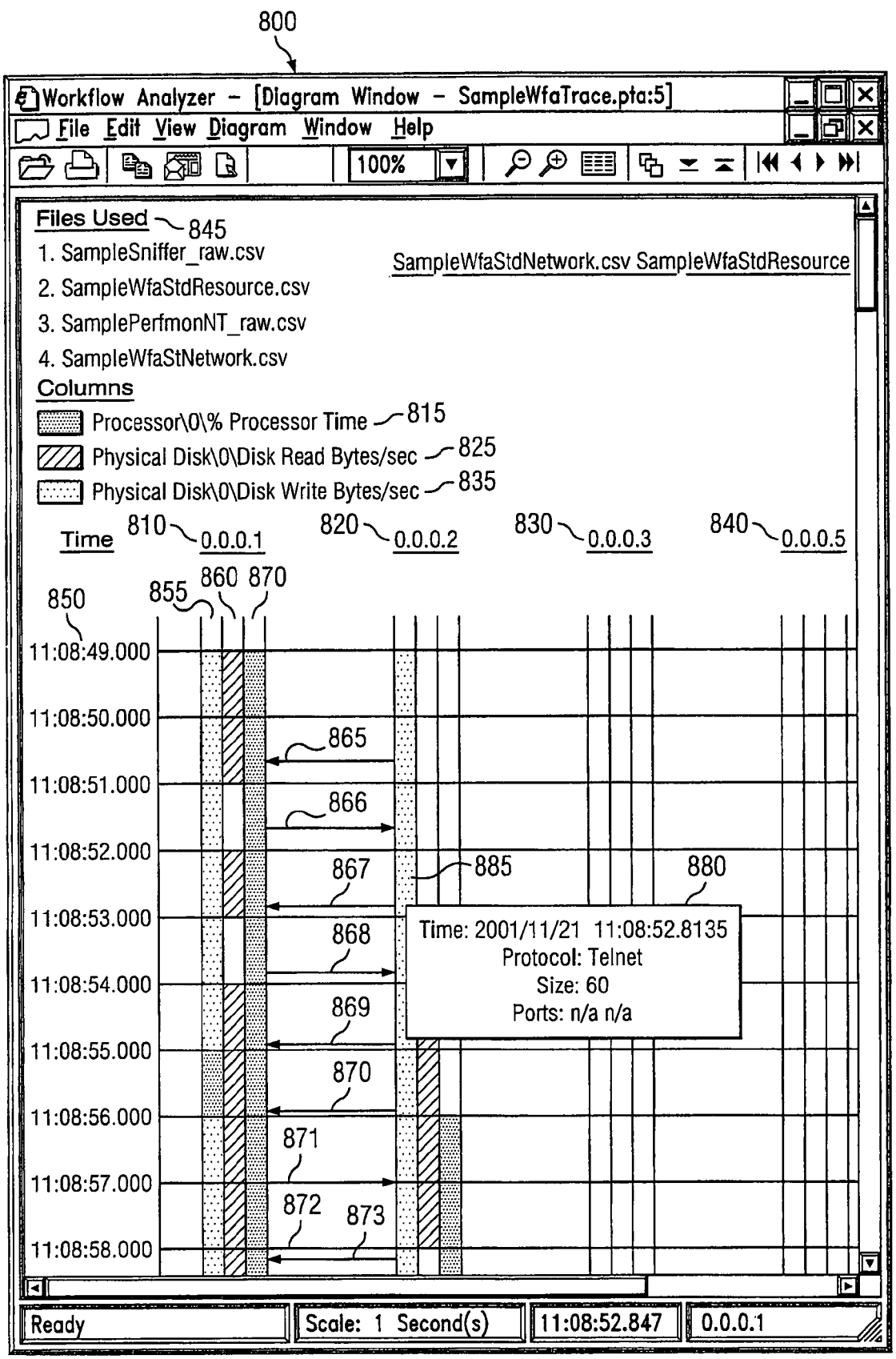
FIG. 7 is an example of a typical graphical display provided by the work flow analyzer tool of the preferred embodiment.

A typical graphical display arrived at by the workflow analyzer tool is shown in FIG. 7 as 845. At 815, the percentage usage to processor time is shown as one of three colors: red, green or blue, depending on processor usage. Physical disk reads, at 825, are shown by the left to right cross-hatching at 825. At 835, physical disk writes are shown by gray shading. These colors form an index which is used for coding for the columns shown at 810, 820, 830 and 840.

The column headers at 810, 820, 830 and 840 are machine addresses for different computers in the network. At 850, the column heading time is the synchronized time for the packet transfer depicted.

Resource usage is displayed as resource "buckets" (the colored boxes) in a vertical column, 855. "Buckets" are derived from resource data by dividing, in the case of CPU utilization, the amount of CPU cycles used by the total amount available to arrive at a percentage. In the case of disk reads and writes, the total amount of disk data read or written during the time period is divided by the duration of the time period. During use, if the user holds the mouse pointer over a resource bucket, such as shown at 885, the workflow analyzer tool displays information specific to the counter that bucket represents. For example, if the Physical Disk\0\Disk Write Bytes/sec counter is chosen, such as shown at 880, the workflow analyzer tool displays the bucket's size in bytes to provide valuable information about the Input/Output performance during this period of time. If another counter is chosen, the display might be a percentage or another measurement unit, such as [include all possibilities].

Network traffic is displayed as horizontal flow lines that represent an event where a source computer address sends a packet to a destination computer address, as shown at 865-873, with arrow heads depicting the direction of transaction flow. If the mouse pointer is moved around the Diagram window, paused over a flow line, the following information about the packet is displayed as a tool tip:

Time—The time when the event occurred.
Duration—the time span covered between two events
Protocol—The protocols used to convey the packet such as TCP, HTTP, and so forth.
Size—The size of the packet in bytes.
Ports—The source and destination of the packet.

The data shown at 800 in FIG. 7 is combined resource and network data. However, the network analyzer tool can display either network data or resource data separately if so desired by the user.

Figure 8A:
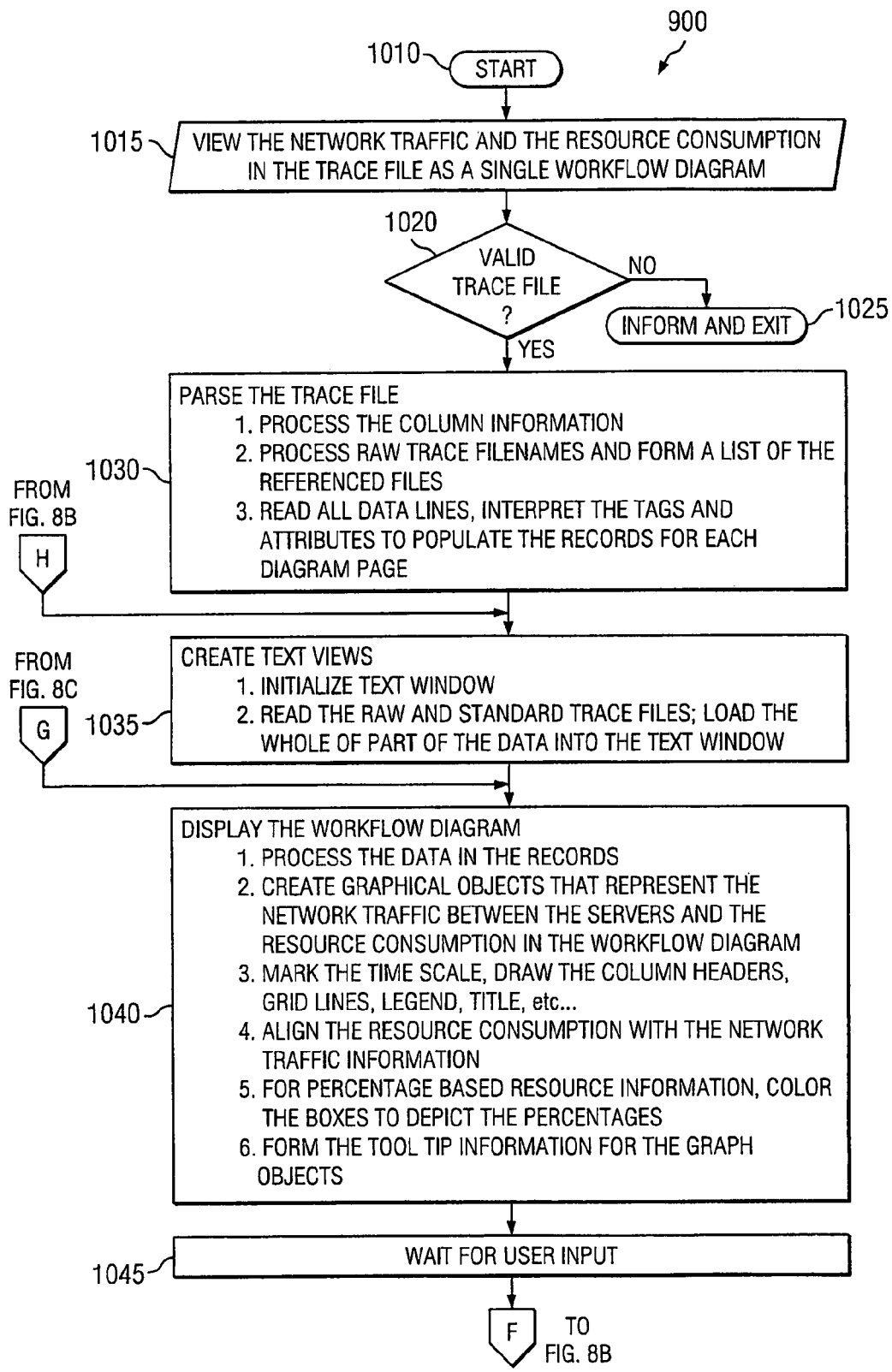
FIG. 8a, 8b and 8c show a flow chart of the logic employed by the workflow analyzer tool of the preferred embodiment of the invention.
Figure 8B:
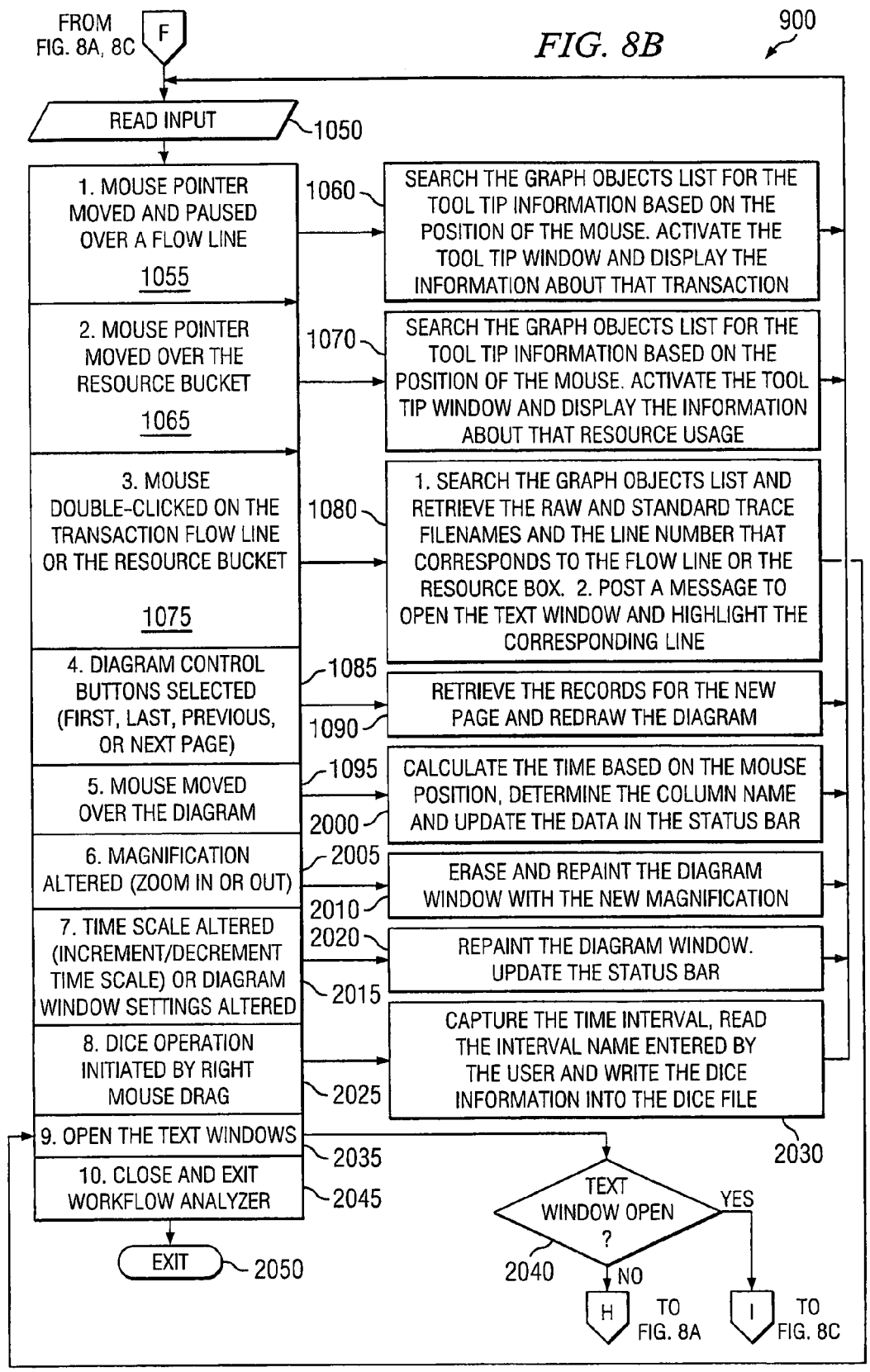
Figure 8C:
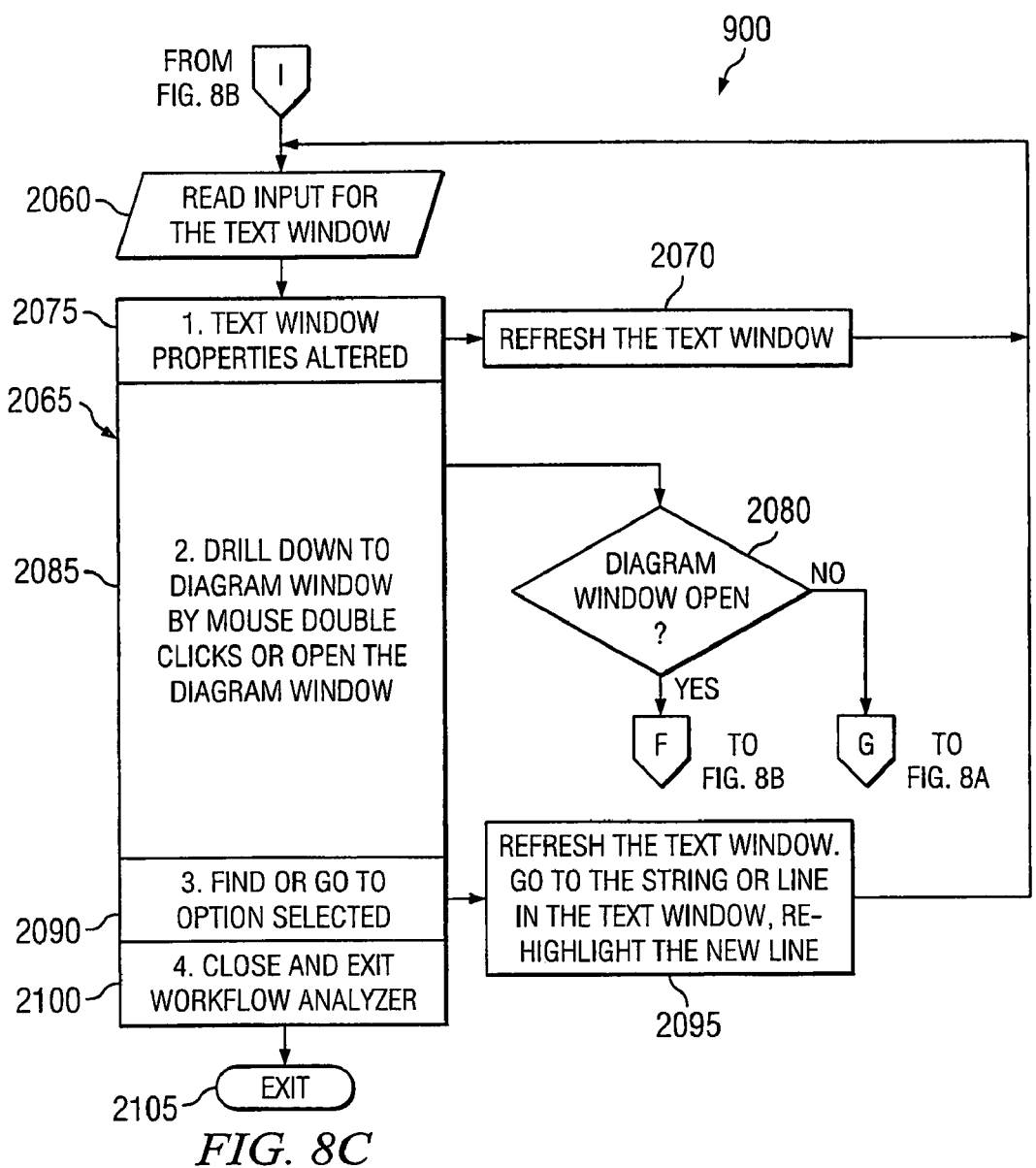

The logical flow diagram for the workflow analyzer tool invention is shown in FIGS. 8a, 8b and 8c.

Beginning at step 1010, the user invokes the workflow analyzer tool from a graphical user interface as will be described below. The program then moves to step 1015. At step 1015, the user selects which network traffic and resource consumption files should be viewed in a single workflow diagram. The program then moves to step 1020 where it determines if the trace file selected by the user is valid. If it is not valid, the program informs the user of the invalid file and exits at step 1025. If the trace file is valid, the program moves to step 1030 where the trace file is parsed to process the column information that contains information about the resource counters. The raw data log, network standard and resource standard file names are then processed to form a list of referenced files. Still in step 1030, all data lines from the files are read and the attributes for each diagram page are populated by interpretation of the tags by splitting the comma-separated data fields in each data line. The tags which are interpreted are time, date, file names, line numbers, graph object types, source, destination and the tool tip information.

The program then moves to step 1035 where text view of the data is created by initializing text windows and reading the raw and standard trace files and loading data into the text window. At step 1040, the work flow diagram is displayed in six steps. First, the data in the records is processed to create graphical objects that represent network traffic between the servers and resource consumption in the work flow diagram. The graphical objects consist of directional arrows in the case of network traffic between the servers and colored blocks for research consumption. The workflow analyzer tool then marks the time scale, draws the column headers, grid lines and legends on the drawing, and arranges the title information. Next, the workflow analyzer tool aligns the resource consumption data with the network traffic information according to the time scale. The resource consumption boxes are then colored according to the percentage information in the files. Next, tool tip information is formulated for the various graph objects which have been drawn. Once the work flow diagram is displayed, the program moves to step 1045 and waits for user input, such as a mouse movement or mouse click.

Moving to FIG. 8b, once a program receives user input, it is read at step 1050. The input can take several steps with resulting actions as shown in FIG. 8b. For instance, if the mouse pointer is moved and paused over a flow line at step 1055, the program searches the graphed objects list for the tool tip information based on the position of the mouse pointer. When paused, it activates the tool tip window and displays the information about the transaction at step 1060. The program then moves back to step 1050 to read further user input. If the user input includes moving a mouse pointer over the resource bucket at step 1065, the program searches the graphed objects list for the tool tip information based on the position of the mouse and activates the tool tip window and displays the information about that research usage at step 1070. The program then moves back to step 1050 to read additional input from the user. If the user double clicks on a transaction flow line or research bucket in step 1075, the program searches the graphed objects list to retrieve the raw data and standard trace file names and line number that corresponds to the flow line or the resource box and posts a message to the open text window, and highlights the corresponding line in text window at step 1080. The program then moves back to the read input step 1060. If the user input is the selection of a diagram control button at step 1085, the program retrieves the records for the new page and redraws the diagram according to the new instructions at step 1090. After step 1090, the program returns to step 1050 to read additional user input. If the user input is a mouse moved over a diagram at step 1095, the program calculates the time based on the mouse position, determines the column name and updates the data in the status bar at step 2000. The program then returns to step 1050. If the user chooses a magnification zoom at step 2005, the program erases and repaints the diagram window with the new magnification at step 2010, returning then to step 1050. If the user alters the time scale at step 1015, the program repaints the diagram window and updates the status bar at step 2020, then returns to step 1050.

If the user initiates a right mouse drag dice operation in step 1025, the program captures the time interval, reads the time interval name entered by the user, and writes the dice information into the dice file at step 2030. The purpose of the dice function is to extract sections of the file for a business function or test run. The dice function identifies the business function or test in the data file and creates a new file and summary for each business function. It then takes an input file and divides it based on the intervals, including beginning and ending time of the business function or event.

The program then moves back to step 1050. If the user chooses to open text window at step 2035, the program proceeds to step 2040 and checks to see if text windows are open. If they are open, the program moves to step 2060 shown in FIG. 8c. If not, the program returns to step 1025 to create original text views. If the user selects input of closing and exiting the Workflow Analyzer at step 2045, the program exits at step 2050.

Moving on to FIG. 8c, once the program receives user input, it is read at step 2060. The input can take several steps with resulting actions as shown in FIG. 8c. For instance, when the text window properties are altered in step 2065, the program refreshes the text window at step 2070 and returns to read additional input at step 2060. The properties altered can be color, font, keyboard assignments and other miscellaneous properties. If the input includes drilling down to a diagram window by mouse double clicks or opening a diagram window at step 2085, the program moves to step 2080 to determine if the diagram window is open. If a diagram window is open, the program returns to step 1050, shown in FIG. 8b. If not, the program returns to step 1040 to display the work flow diagram.

If the read input from step 2060 is a "find" or "go" option, at step 2090 the program refreshes the text window and then scrolls to the line in the text window to highlight a new line in step 2005 "Find" can be used to find a specified string or expression in a text window. "Go to" can be used to navigate to the specified line in a text window. The program then returns to step 2060 to await further input. If the input consists of a closed and exit choice at step 2100, the program exits at step 2105.

Application Model Generator Tool

The invention also provides for an application model generator tool which accepts as its input transaction reports generated by the performance profiler tool.

The tool also provides a method of automatically generating an executable simulation model of the enterprise application from those spreadsheets. That application model can then be executed to predict the performance of the system with various workloads on a variety of hardware environments.

The function of the application model generator tool of the preferred embodiment is to rearrange and summarize the data from the profiler transaction report into a set of Microsoft® Excel spreadsheets which can be easily understood and modified by the user for final input into any one of a number of computer simulations software packages which allow for simulation of complex systems.

The data organized by the application model generator spreadsheets is automatically translated into a workload and application performance model that is merged with an infrastructure (hardware and network topology) model to form a complete executable simulation model.

The target for the output of the application model generator in the preferred embodiment is the HyPerformix Infrastructure Optimizer™ tool. The HyPerformix Infrastructure Optimizer™ tool provides a discrete event simulation engine and an Application Definition Notation (ADN) scripting language for creating models of software applications. Hyperformix Infrastructure Optimizer™ and ADN provide modeling abstractions for processes, computers, networks, workloads and the four classes of resources the application model generator uses (inter-process communication, CPU, disk input/output and memory) and provides a general Java-like programming language for specifying classes, methods and general program control flow. The AND language is described further in U.S. patent application Ser. No. 09/753,192 which is incorporated herein by reference. It should be understood that other discrete event simulation engines can also make use of the output data from the application model generator tool.

The mapping from the application model generator tool data organization into HyPerformix Infrastructure Optimizer™ is summarized in the following table:

| AMG Source Item(s) | HyPerformix Infrastructure Optimizer Target Item(s) |
| --- | --- |
| Client | Client Workload |
| Workload | Client Workload Behavior |
| Subsystem | Server Process |
| Client and subsystem computer names | Names of workstations and computers in Optimizer infrastructure (hardware and network topology) model |
| Business Function Flow | Within the corresponding Client Workload Behavior, a set of conditional calls to behaviors implementing the transactions |
| Transaction Flow | Within the behavior implementing the transaction, a sequence of Send statements to invoke callee transactions |
| Callee transaction within Transaction Flow | A Send statement to the process implementing the calle subsystem requesting the service implementing the callee transaction |
| CPU, I/O and Memory consumption on Transaction Properties sheet | CPU, Read, Write and Memory parameters of Execute statement |
| Request and Reply Message sizes on Transaction Properties sheet | Message size parameters of Send and Reply statements |

The tool provides a method of organizing enterprise performance model data as a set of spreadsheets and transforming the business transaction workflow representation into such a set of spreadsheets for human understanding and manipulation.

With this mapping, the transformation is straightforward. The translator simply generates the corresponding target items for each source item.

The user generates the hardware infrastructure model manually using the HyPerformix Infrastructure Optimizer™ tool. The infrastructure model consists of a networked topology of workstations, server computers, network segments, data links, routers and switches along with the appropriate characteristics (e.g., capacities) of each such component.

The merger of the workload, application and infrastructure models is also straightforward. The client workloads and processes from the workload and application models are simply attached to the corresponding workstations and server computers in the infrastructure model by name.

This invention of automatically translating the application model generator tool data organization into an executable performance model can be applied to any target simulation environment that supports the concepts of computer networks, distributed applications, and queuing for network, cpu, disk input/output and memory resources.

The application model generator tool invention employs a novel minimum parameter set including the following parameters:

1. Workload
    Clients: the identification of client groups, the workstations they use (identified by name), the client type (as either closed or open—meaning the client waits (closed) or does not wait (open) for a response to the business function previously submitted by the client before submitting the next business function), the number of clients in the group, the frequency with which the client executes its workload and the name of the workload executed by the client group
    Workloads: the definition of each workload as a sequence of business functions, each of which is executed with a specified probability, and may be followed by an optional think time,
2. Application
    Business Function Flow: the sequence of transactions generated by the user of each business function, the subsystem in which the transaction executes and the transaction invocation type (synchronous or asynchronous)
    Transaction Flow: the sequence of subtransactions generated by each transaction, the subsystem in which each subtransaction executes and the invocation type (synchronous or asynchronous).
    Transaction Properties: the server time and resources consumed by each execution of each (sub) transaction, including average cpu time, file input/output, memory, request message size and reply message size.
3. Deployment
    Configuration: For each subsystem, the name of the computer on which that subsystem executes and maximum number of threads that subsystem may execute concurrently.

The minimum parameter set is automatically derived from the transaction workflow reports produced by the performance profiler tool described above.

Five spreadsheets are generated in the application model generator tool: the business function flow, transaction flow, transaction properties, workload, and client spreadsheets. Each of these spreadsheets has certain information that is imported into it from the transaction reports generated by performance profiler automatically. Additionally, the spreadsheets allow the user to add information necessary for completing a simulation model for submission to a simulation program. The preferred embodiment requires that the CPU time, I/O and memory usage data be included manually in the spreadsheets where required.

The flow charts shown in FIGS. 13a through 13f describe the process of transforming the transaction reports into the spreadsheets. In those flow charts, the following notation is used:
    TR.Y refers to field Y of the current line of the current transaction report input file.
    TR.Requestor refers to the Requestor field of the current Transaction Report line with the :port# suffix removed.
    TR.Replier refers to the Replier field of the current Transaction Report line with the :port# suffix removed.
    AMG.X refers to field X of the current row of the current sheet of the generated AMG profile spreadsheet.
    BFN refers to the current business function name.
    & refers to the text concatenation operation.
    =refers to the equality operation.
    :=refers to assignment operation The process to transform transaction reports into AMG spreadsheets begins with step 2505 on FIG. 13a. The processing returns to this point (step 2500) after each transaction report file has been completely processed.

If there is no additional transaction report file that has not yet been transformed (step 2510), the process proceeds to the Wrap Up steps beginning with step 2515, connecting to step 2815 on page 13f.

Otherwise, the next transaction report file is selected for processing (step 2525). A row is added to the AMG Business Function Flow sheet (step 2530). If a Business Function name is present in the transaction report file (step 2540), that name is assigned to the business function name working variable (BFN, step 2545). Otherwise, BFN is assigned the name of the transaction report file name (with the file name extension removed; step 2535).

The Business Function field of the current row of the Business Function Flow sheet is assigned the value of BFN. The process continues with the next transaction report input line (step 2555 connecting to step 2560 of page 13b).

Processing of the next transaction input line begins with step 2560. If there is no unprocessed input line in the current transaction report file (step 2565), the processing proceeds to the next transaction report file (step 2570, connecting to step 2500). Otherwise, the next line from the current transaction report file is selected for processing (step 2575).

If the Caller field of the current transaction report line does not equal "n/a" (step 2585), processing proceeds with transaction flow (step 2590, connecting to step 2625 of page 13c). Otherwise, a row is added to the AMG Business Function Flow sheet (step 2580).

The Subsystem field of the current row of the AMG Business Function Flow sheet is assigned a value equal to the Replier field of the current transaction report line (with the :port# suffix removed ) concatenated with "_Subsystem" (step 2595).

The Transaction field of the current row of the AMG Business Function Flow sheet is assigned a value equal to BFN concatenated with "_"concatenated with the Name field of the current transaction report line (step 2600).

If the Response Time field of the current transaction report line equals "n/a" (step 2610), the Invocation Type field of the current row of the AMG Business Function Flow sheet is assigned the value "Asynchronous" (step 2615). Otherwise, it is assigned the value "Synchronous" (step 2605).

The processing proceeds with the transaction properties steps, beginning with step 2620, connecting to step 2685 of page 13d.

Transaction Flow processing begins with step 2625. A row is added to the AMG Transaction Flow sheet (step 2630). If a row exists on the AMG Transaction Sheet with the Caller Transaction field equal to BFN concatenated with "_" concatenated with the value of the Caller field of the current transaction report line (step 2640), the following steps are performed:

The Caller Subsystem field of the current AMG transaction flow sheet is assigned the value of the Requestor field (minus the :port# suffix) of the current transaction report line concatenated with "_Subsystem" (step 2635)

The Caller Transaction field of the current AMG transaction flow sheet is assigned the value of BFN concatenated with "_" concatenated with the value of the Caller field of the current transaction report line (step 2645).

A row is added to the AMG transaction flow sheet (step 2650).

The Callee Subsystem field of the current AMG Transaction Flow row is assigned the value of the Replier field (minus the :port# suffix) concatenated with "_Subsystem" (step 2655).

The Callee Transaction field of the current AMG Transaction Flow row is assigned the value of BFN concatenated with "_" concatenated with the value of the Name field of the current transaction report line (step 2660).

If the Response Time field of the current transaction report line equals "n/a", the Invocation Type field of the current row of the AMG Transaction Flow row is assigned the value "Asynchronous". Otherwise, it is assigned the value "Synchronous".

Processing proceeds with the Transaction Properties steps (step 2680, connecting to step 2685 of page 13*d*).

The Transaction Properties steps begin with step 2685. If there is no row on the AMG Transaction Properties sheet with the Subsystem field equal to the Replier field (minus the :port# suffix) of the current transaction report line (step 2690), processing proceeds to the new subsystem steps (step 2695, connecting to step 2765 of page 13*e*). Otherwise, processing proceeds with step 2705. Processing also returns to this point (step 2705) after a new transaction is detected (step 2710).

A row is added to the AMG Transaction Properties sheet (step 2705). The Transaction field of the current row of the AMG Transaction Properties sheet is assigned the value BFN concatenated with "_" concatenated with the value of the Name field of the current transaction report line (step 2700).

A row is added to the AMG Transaction Properties sheet (step 2715). The Property, Property Value and Property Unit fields of this row are assigned the values "Service Time", the value of the Service Time field of the current transaction report line, and "Seconds" (step 2720).

A row is added to the AMG Transaction Properties sheet. The Property field of this row is assigned the value "Message Sizes".

Rows are added to the AMG Transaction Properties sheet for CPU, I/O and Memory resources for later manual entry (step 2735).

A row is added to the AMG Transaction Properties sheet (step 2740). The Property, Property Value and Property Unit fields of this row are assigned the values "Request Size", the value of the Request Size (Payload) field of the current transaction report line and "Bytes" (step 2745).

A row is added to the AMG Transaction Properties sheet (step 2750). The property, property value and property unit fields of this row are assigned the values "Reply Size", the value of the Reply Size (Payload) field of the current transaction report line and "Bytes" (step 2755).

Processing continues with the next transaction input line (step 2760, connecting to step 2560 of page 13*b*).

The processing of a new subsystem begins with step 2765. A row is added to the AMG Transaction Properties sheet (step 2770). The Subsystem field of this row is assigned the value of the Replier field (minus the :port# suffix) of the current transaction report line concatenated with "_Subsystem" (step 2775).

A row is added to the AMG Subsystem sheet (step 2780). The Subsystem field of this row is assigned the value of the Replier field (minus the :port# suffix) of the current transaction report line concatenated with "_Subsystem" (step 2785).

A row is added to the AMG Subsystem sheet (step 2790). The Property and Property Value fields of this row are assigned the values "Computer Name" and the Replier field (minus the :port# suffix) of the current transaction report line (step 2795).

A row is added to the AMG Subsystem sheet (step 2800). The Property and Property Value fields of this row are assigned the values "Number of threads" and 32 (step 2805).

Processing continues with a new transaction (step 2810, connecting to step 2710 of page 13*d*).

Wrap Up processing begins with step 2815. Default AMG Application, Client, and Workload sheets are created for later manual modification (step 2820).

The algorithm terminates at this point (step 2830).

The transaction report shown in FIGS. 9*a* and 9*b* show a number of transactions beginning at line 7 of the report. Each of these transactions will be translated into a transaction specification on the transaction properties spreadsheet and flow information on either the business function flow or the transaction flow worksheet. For clarity, the steps of FIG. 13*a-f* appear parenthetically where applicable. If an "n/a" appears in column C of FIG. 9*a* for a transaction, the flow (step 2585 of FIG. 13*b*) information will be translated to the business function flow spreadsheet (step 2580); otherwise, the flow information will be translated to the transaction flow spreadsheet (step 2590).

Referring to FIG. 10*a*, the business function name shown at column A is imported directly from column B on FIG. 9*a* of the transaction report if the business function name has been assigned by the user (step 2545). If the user has not assigned a business function name, the automatic model generator assigns the input transaction report base file name (without suffix) as a business function name (step 2535). The subsystem column B of FIG. 10*a* on the business function flow spreadsheet indicates the responding subsystem and is named from a concatenation of the replier name in FIG. 9*a*, column F, and the word subsystem (step 2595). In the example represented by FIG. 9*a* and FIG. 10*a*, the business function name is "payroll_trans" which is taken from the transaction report file name shown in the upper border of FIG. 9*a*. Similarly, the subsystem identification shown in column B of the spreadsheet at FIG. 10*a* comes from the replier name at column F (with the ":" and port number removed) of FIG. 9*a* plus the string "Subsystem".

The transaction identification at column C of FIG. 10*a* is a concatenation of the business function name, an "_" and the transaction name in column D of FIG. 9*a* (step 2600). The invocation type, that is synchronous or asynchronous shown in column D of FIG. 10*a*, is automatically imported from profiler as synchronous unless an "n/a" is found in column H of FIG. 9*a* for that transaction in which case it is asynchronous (steps 2605, 2610 and 2615).

Moving to FIG. 10*c*, the transaction flow spreadsheet shows five columns including caller subsystem at column A, caller transaction at column B, callee subsystem at column C, callee transaction at column D, and invocation type at column E.

The caller subsystem is a subsystem responsible for executing the caller transaction. Its name is created from the requester column E of FIG. 9a (step 2635). The caller transaction name is created from the business function and the "Caller" from column C of FIG. 9a (step 2645). Associated with each callee transaction is a callee subsystem as shown at FIG. 10c, column C. In this case, the web-logic subsystem name is derived from the replier name, column F of FIG. 9a (step 2655). The callee transaction, column D of FIG. 10c, is created from the business function name and the (profiler assigned) name in column D, FIG. 9 (2660). Again, the invocation type at column E is determined from the transaction response time, column H of FIG. 9 (steps 2665, 2670 and 2675). In this example, all transactions are synchronous with the exception of line 15 of FIG. 10c which is asynchronous. Line 15 corresponds to line 19 on FIG. 9a, which is a call to a log server which has no transaction response time.

Moving to FIG. 10b, the transaction properties spreadsheet is shown from the application model generator. At column A, the subsystem is shown which is derived from the replier, column F on FIG. 9a (step 2775). Associated with it are transactions which are named for the business function name plus information from column D on FIG. 9a according to the correct transaction (2700). The property column, shown at column C of FIG. 10b, provides specific properties for each transaction listed in column B. The property values for server time, in this example 0.829 seconds, are derived from column J of FIG. 9b, line 8 (step 2720). Similarly, the message request size, as shown at lines 239, column D of FIG. 10b, of 331 bytes, is derived from the transaction report at column N of FIG. 9b, line 8 in this example (step 2745). The reply size on FIG. 10b, shown in this example as line 240, being 6057 bytes, is derived directly from column Q of FIG. 9b, this example shown at line 8 (step 2755). Similarly, the server time, shown at line 224, in this example 0.829 seconds, in column D of FIG. 10b, is derived from column J of FIG. 9b at line 8 (for this example).

Figure 10D:
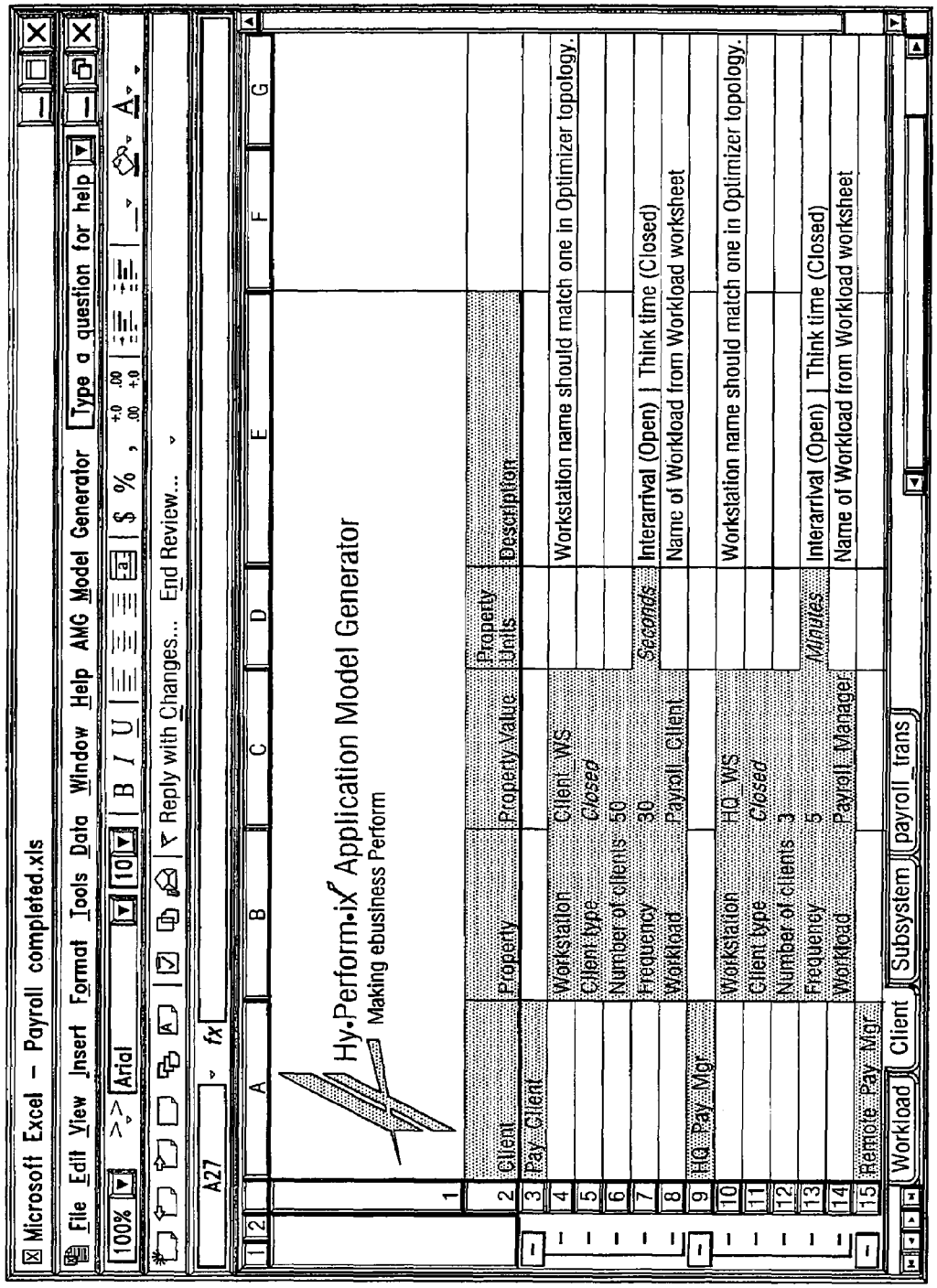

FIG. 10d shows an application model generator spreadsheet entitled "client" which allows the user to add additional information to the spreadsheet which is imported into other simulator applications. The data added by the users manually in FIG. 10d includes client identification in column A, properties for each client in column B, property values for each property in column C, property units in column D, and a notation description in column E. In order to comply with the minimum parameter set, each identified client will need to have values defined for each of these properties. The frequency designation defines the "think time" if the client type is closed and/or the "interarrival time" if the client type is open. "Think time" is the average amount of projected time between the clients' invocation of the workload following completion of the previous invocation. "Interarrival time" (open workload) is the average time between invocations of the workload, regardless of whether the previous invocation has been completed or not. The workload property shown at column B refers to a separate tab on the spreadsheet which is shown at FIG. 10f.

Figure 10E:
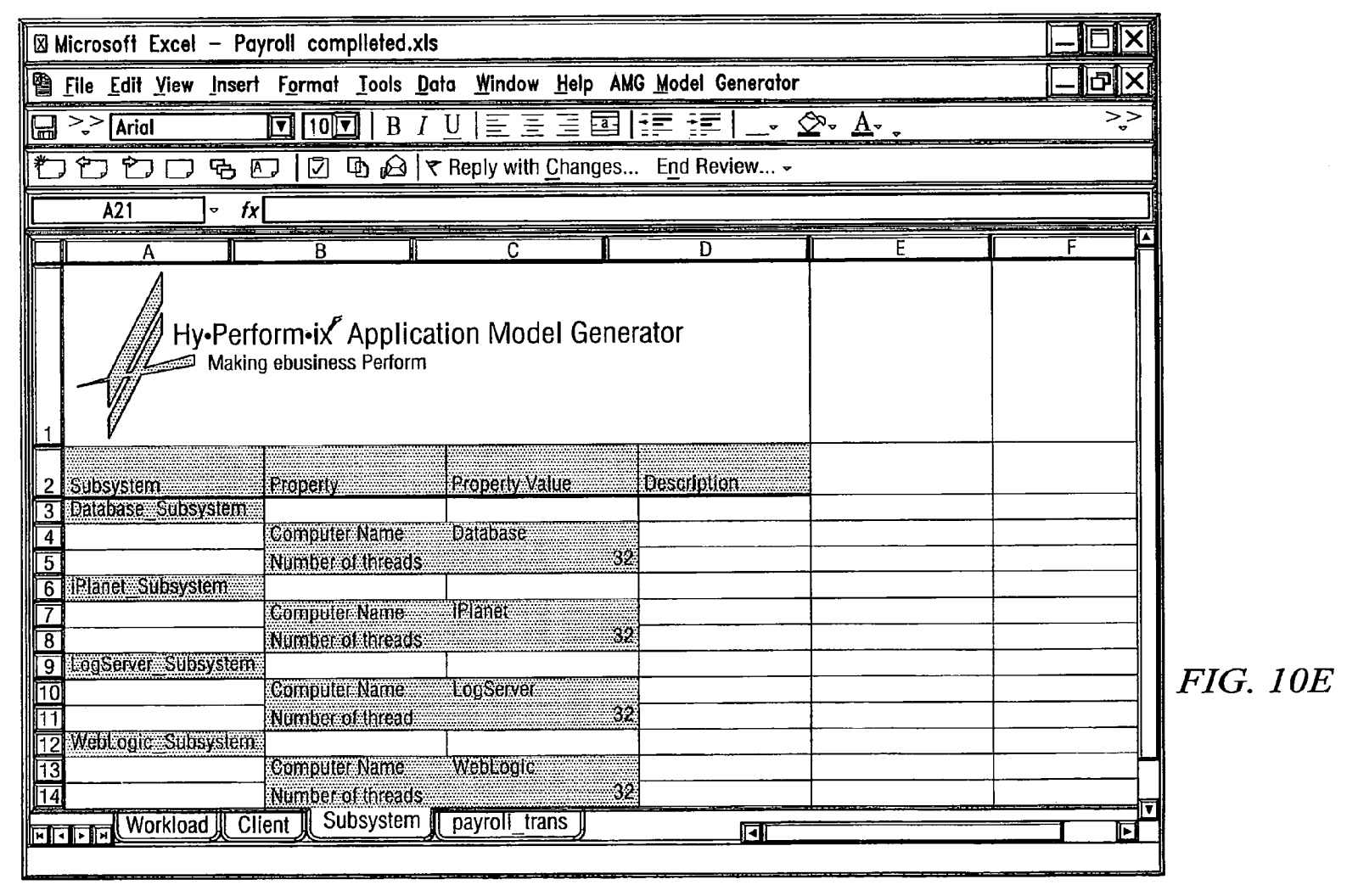
Figure 10F:
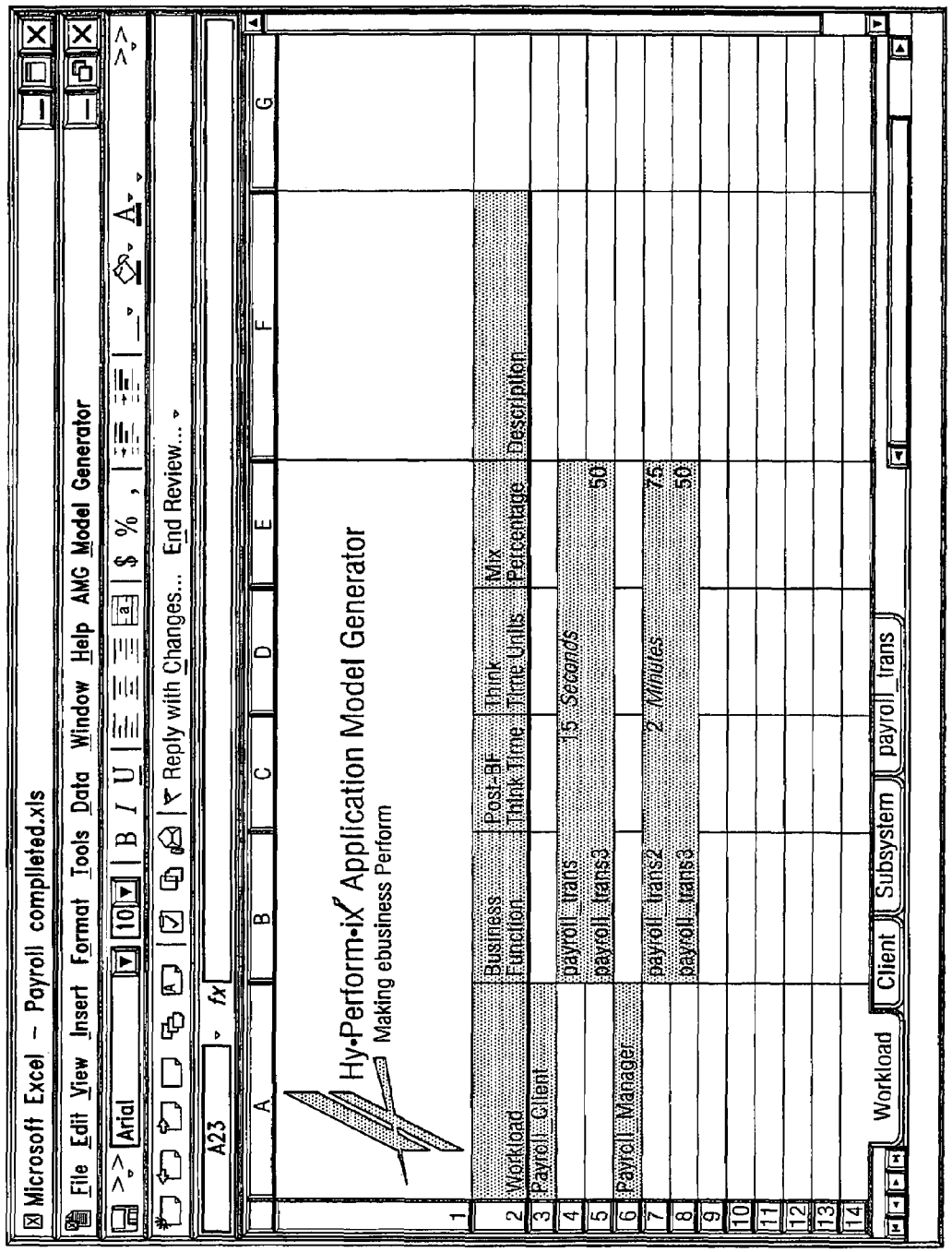

At FIG. 10f, for each workload designation at column A, a sequence of business functions may be specified in column B for execution. Each business function execution may also specify post-function think time, think time units, and mix percentage information in columns C, D and E of FIG. 10f. The mix percentage at column E may be used to specify the percentage of this workload's invocations that this business function will be executed.

FIG. 10e shows the subsystem tab from the application model generator. The information imported into the spreadsheet comes directly from the transaction report and is a listing of subsystems, properties and property values shown at columns A, B and C. The subsystems are determined from the requester and replier columns, columns E and F of FIG. 9a. The property column is a heading column. The property values are the names for various computers in the network shown as requesters and repliers in columns E and F of FIG. 9a. The number of threads is a parameter set by the user which indicates the maximum number of concurrent transaction requests that can be processed on each subsystem (steps 2785-2805).

Figure 10G:
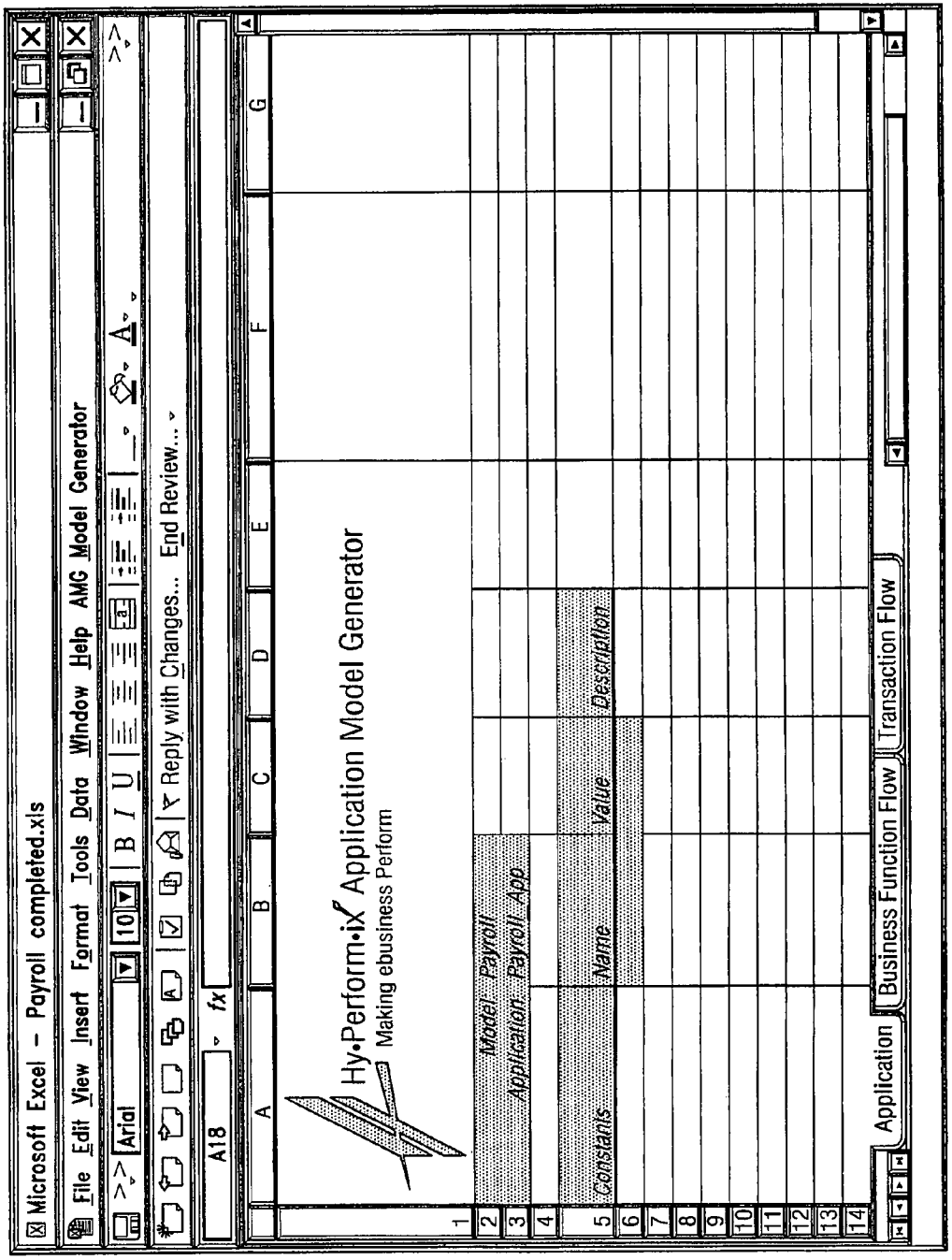

FIG. 10g shows the application tab of the application model generator which allows various columns to be filled out by the user to define the names of models, application (so that multiple applications can be combined into a single model in Infrastructure Optimizer) and other convenient global constants used for model simulation.

Workload and application models are automatically generated from such spreadsheets by selecting "Generate Model" from a menu. The generated models may be merged with a HyPerformix Infrastructure Optimizer™ hardware topology model or other hardware topology models to create a complete predictive performance model that may be simulated to identify performance problems and evaluate potential solutions to those problems.

Performance models of enterprise application environments are typically specified in general-purpose procedural modeling languages, such as GPSS or Simscript, perhaps supplemented with a drag-and-drop graphical user interface for constructing a network topology, data flow or control flow graph (e.g., OPNET Modeler or HyPerformix Infrastructure Optimizer).

The method is complete in that it allows the user to specify all interesting enterprise application environments. It is minimal in that it focuses on only the essential performance characteristics of those environments. Minimalism reduces the data required to be collected and analyzed, as well as the programmatic translation required to generate a performance model.

Graphical Centralization Tool

Figure 11:
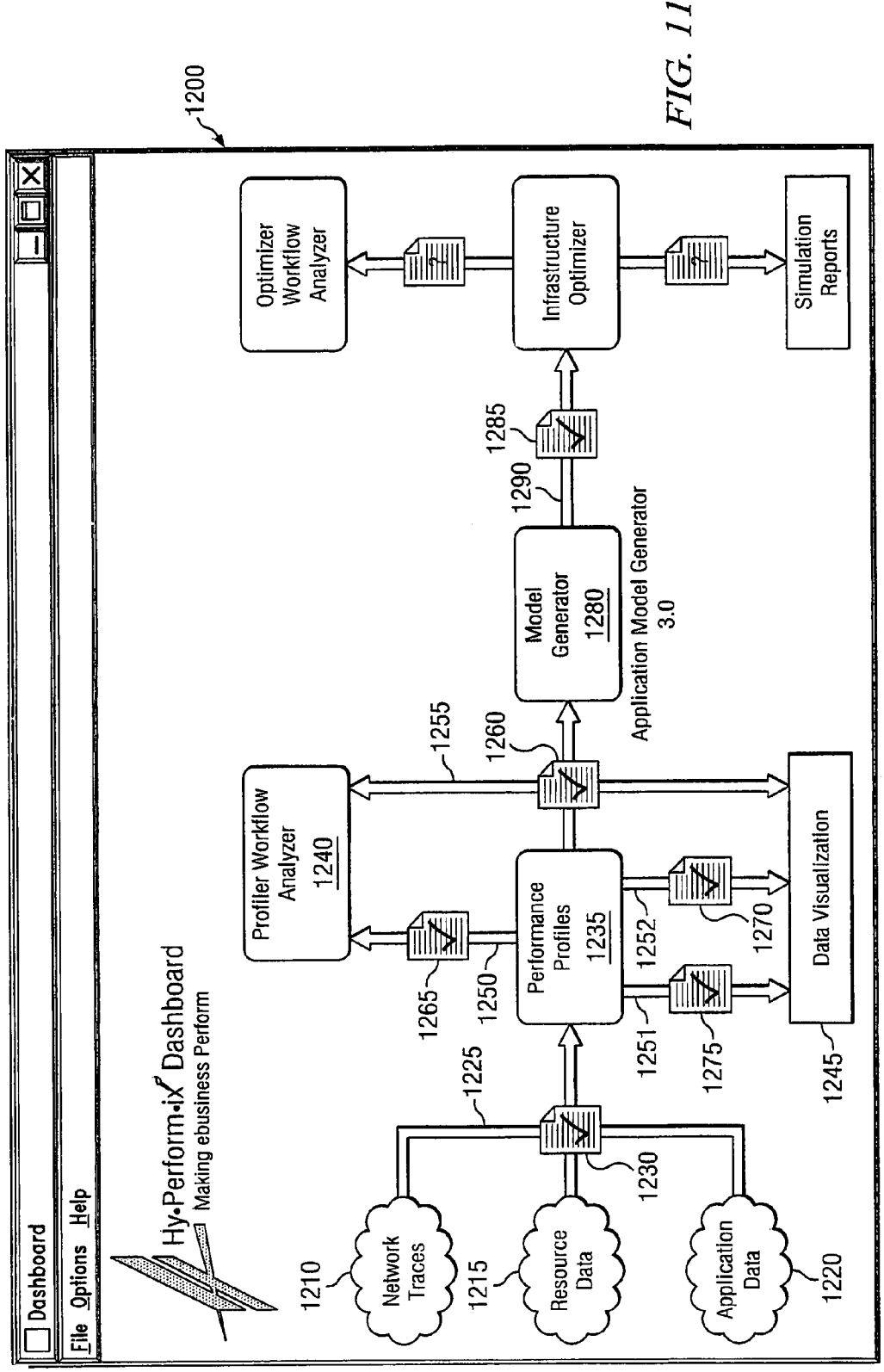
FIG. 11 shows the graphical user interface of the graphical centralization tool of the preferred embodiment of the invention.

The current invention also includes a method of graphical centralization of all the functions of the invention into a single graphical user interface shown in FIG. 11 at 1200. The graphical user interface shows the overall data flow in the performance analysis process. It guides the user through the proper sequence of steps in the process and ensures that the outputs from each step of the process are used as inputs for legitimate and subsequent steps. The graphical user interface also allows the user to see which steps of the overall performance analysis have or have not been performed and the current status of each of the data files in the process.

The rounded rectangles in the graphical user interface 1200, described further below, represent the various software tools of the current invention which are used in the analysis process. For example, at 1235, the performance profiler tool may be activated by right mouse clicking to provide a set of pop-up menus for tool-specific options. Similarly, the graphical user interface provides access to the model generation tool spreadsheets at step 1280 by a right mouse click button on this rectangle. The rectangle at step 1240 provides access to the work flow analyzer tool as previously described. A right mouse click on box 1245 allows access to the data visualization tool.

In the graphic user interface, there are clouds 1210, 1215 and 1220 which represent network trace data, resource data and application data as previously described. Arrows are present in the graphical user interface at 1225, 1250, 1255 and 1290 which guide the user through the correct utilization of the data files.

The GUI also provides file icons at 1230, 1260, 1265, 1270, 1275, and 1285 which represents files which are actually on disk. Moreover, the file icons are active and represent the state of the file. For instance, a green checkmark on any one of the file icons indicates that the file is known, exists, and is up-to-date. A red checkmark indicates that the file is known, it exists, but is not up-to-date. A "?" means that the icon has not been associated with any file yet. An "X" across any one of the file icons indicates that the file has a name, but does not exist on the disk.

Each of the file icons also indicates that proper form of the data. For instance, the data files represented by icon 1230 must be raw trace files such as .pm or .txt files. The data represented by icon 1275 must be data in resource standard format. The data files represented by icons at 1265 and 1270 must appear in network standard format. The files which are represented by the icon 1260 must appear as transaction report files such as .csv files. The data files represented by the icon at 1285 must be .xml files and .adn files in the preferred embodiment; however, if another modeling tool has been chosen by the user, these files may differ.

In practice, the user begins the analysis process by opening the graphical centralization GUI and locating network trace files, resource data files and application data files by clicking on icon 1230. If these files are present, the user follows the arrow 1225 to the performance profiler tool to recognize all the transactions in the raw data provided. After executing the steps in the performance profiler, the user may proceed through arrow 1250 to determine if the data is correct at icon 1265. If so, the user may visualize the "bounce diagram" produced by the work flow analyzer tool at 1240. Alternatively, the user may proceed along arrows 1251 or 1252 to determine if the data at icons 1275 and 1270 is present and in the correct form. If so, the user may move to the data visualization tool at 1245 to visualize the graphs produced by the raw data. The user is then guided by arrow 1255 to determine whether the transaction reports at 1260 are present in the correct format. If so, the user may again visualize the data at 1240 and 1245 or may move to the application model generator tool at 1280. Once modification of the spreadsheets in the application model generator tool is complete, the user is guided by arrow 1290 to determine if the data files are proper at 1285. If so, the user is then guided to other simulation tools for final analysis.

The invention claimed is:

1. A performance modeling computer system for maintaining and improving end user performance of a system of interconnected computers, operating a plurality of applications, the performance modeling computer system in communication with a set of resource data, a set of network data and a set of application data derived from the system of interconnected computers comprising:
   a pipeline application, running on a processor connected to the system of interconnected computers, for processing the set of resource data, the set of network data and the set of application data, the pipeline application further comprising a first converter device, a second converter device and a third converter device;
   the first converter device, in communication with the system of interconnected computers, for organizing the set of resource data, the set of network data and the set of application data into a plurality of data records;
   the second converter device, in communication with the system of interconnected computers, for organizing the plurality of data records into a plurality of data arrays;
   the third converter device, in communication with the system of interconnected computers, for organizing the plurality of data arrays into a plurality of hash tables;
   the plurality of data arrays including a data array that is organized into a network standard format wherein the network standard format further includes a time series of values comprising at least a time stamp value, a source address value, a destination address value, a relative time value, a delta time value, a size value, a protocol value, a summary value and a tags value including a set of color coding tags for visualization purposes;
   a disk storage means for storing and retrieving the plurality of hash tables;
   a graphic user interface, on a display device connected to the system of interconnected computers, for representing the plurality of hash tables as a set of results to maintain and improve end user performance of the system of interconnected computers.

2. The system as in claim 1 wherein the set of network data is trace data.

3. The system as in claim 1 wherein the set of resource data is a set of computer performance monitor data generated by at least one of the interconnected computers in the system of the interconnected computers.

4. The system of claim 1 wherein the plurality of data arrays includes a data array that is organized into a resource standard format.

5. The system of claim 3 wherein the hash tables include columns for message size and server time.

6. The system of claim 3 wherein the hash tables include columns for transaction sources and destinations.

7. The system of claim 3 wherein the hash tables include columns for transaction size.

8. The system of claim 3 wherein the hash tables include columns for transaction launch time.

9. The system of claim 3 wherein the hash tables include columns for transaction response time.

10. The system of claim 1 wherein the pipeline application further comprises a transaction recognizing means for recognizing transactions in the set of network data and aggregating the recognized transactions.

11. The system of claim 10 wherein the transaction recognizing means is further for deducing a parentage among recognized transactions.

12. The system of claim 10 wherein the transaction recognizing means is further for filtering a set of extraneous transaction related data.

13. The system of claim 1 wherein the tags value contains a set annotations to support transaction recognition.

14. The system of claim 1 wherein the tags value contains a set of pointers to original sources of data.

15. The system of claim 6 wherein the resource standard format includes a time series of values comprising at least a time stamp value, a tags value and a plurality of counter data values.

16. The system of claim 15 wherein the counter data values contain at least one of the group of CPU utilization, disk reads per second and disk writes per second.

17. The system of claim 1 wherein the graphical user interface further comprises a visualization means to display and to manipulate data arrays represented in network standard format and resource standard format.

18. The system of claim 1 wherein the graphical user interface further comprises a work flow analyzer means for combining and manipulating the set of resource data.

19. The system of claim 1 wherein the pipeline application is configurable.

20. The system of claim 1 wherein the pipeline application is extendible.

* * * * *